US009757747B2

(12) United States Patent
Johnson et al.

(10) Patent No.: US 9,757,747 B2
(45) Date of Patent: *Sep. 12, 2017

(54) METHODS AND SYSTEMS FOR CREATING AEROSOLS

(71) Applicant: Palo Alto Research Center Incorporated, Palo Alto, CA (US)

(72) Inventors: David Mathew Johnson, San Francisco, CA (US); Victor Beck, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 14/288,049

(22) Filed: May 27, 2014

(65) Prior Publication Data

US 2015/0343468 A1    Dec. 3, 2015

(51) Int. Cl.
*B05B 17/04* (2006.01)
*B05B 9/03* (2006.01)
(Continued)

(52) U.S. Cl.
CPC ............. *B05B 9/03* (2013.01); *B01J 13/0095* (2013.01); *B05B 17/04* (2013.01); *B05B 7/0075* (2013.01); *B05B 15/04* (2013.01)

(58) Field of Classification Search
CPC B05B 9/03; B05B 17/04; B05B 15/04; B05B 7/0075; B01J 13/0095
(Continued)

(56) References Cited

U.S. PATENT DOCUMENTS 2,291,046 A     7/1942  Lange
3,406,660 A  * 10/1968  Simm ..................... B05B 5/08
                                                           118/300
(Continued)

FOREIGN PATENT DOCUMENTS

EP          2227834         8/2011

OTHER PUBLICATIONS

Non-Final Office Action for U.S. Appl. No. 14/066,435, dated Jan. 21, 2016, 29 pages.
(Continued)

*Primary Examiner* — Arthur O Hall
*Assistant Examiner* — Joel Zhou
(74) *Attorney, Agent, or Firm* — Marger Johnson

(57) ABSTRACT

Aerosols can be created by filament stretching and breaking of Newtonian and non-Newtonian fluids by applying a strain to and stretching the fluid. The fluid is stretched along a strain pathway and forms a fluid filament between diverging surfaces. The stretched fluid filament breaks into droplets that can be harvested to form a mist or aerosol. The aerosol creation systems can include one or more pairs of counter-rotating rollers that are positioned adjacent to each other that stretch the fluid or a pair of pistons that move toward and away from each other to stretch the fluid. Some aerosol creation systems can include multiple pairs of counter-rotating rollers that are positioned in a circular, oval, or linear pattern. The aerosol creation system with multiple pairs of counter-rotating rollers can generate mist is one or more directions and can be positioned between two concentric rings or linearly, among other configurations.

12 Claims, 32 Drawing Sheets

(51) Int. Cl.
  *B01J 13/00* (2006.01)
  *B05B 7/00* (2006.01)
  *B05B 15/04* (2006.01)

(58) Field of Classification Search
  USPC ......... 239/219–221; 101/147, 148, 350, 363, 101/364, 367, 141
  See application file for complete search history.

(56) References Cited

U.S. PATENT DOCUMENTS

| | | | |
|---|---|---|---|
| 3,554,815 A | 1/1971 | Otto | |
| 3,626,833 A | 12/1971 | Koch | |
| 3,649,829 A | 3/1972 | Randolph | |
| 3,702,258 A | 11/1972 | Gibbons et al. | |
| 3,717,875 A | 2/1973 | Arciprete et al. | |
| 3,873,025 A | 3/1975 | Qvarnstrom | |
| 3,926,114 A | 12/1975 | Matuschke | |
| 3,988,986 A * | 11/1976 | Zimmer | B41F 15/40 101/119 |
| 4,034,670 A | 7/1977 | Zavodny | |
| 4,222,059 A | 9/1980 | Crean et al. | |
| 4,384,296 A | 5/1983 | Torpey | |
| 5,022,948 A * | 6/1991 | Hallworth | B05C 1/10 118/258 |
| 5,270,086 A | 12/1993 | Hamlin | |
| 5,314,119 A | 5/1994 | Watt | |
| 5,332,472 A * | 7/1994 | Cutright | A24D 1/025 118/211 |
| 6,382,524 B1 | 5/2002 | James | |
| 6,576,861 B2 | 6/2003 | Sampath et al. | |
| 6,622,335 B1 | 9/2003 | Anderson et al. | |
| 6,934,142 B2 | 8/2005 | Grosse et al. | |
| 7,083,830 B2 | 8/2006 | Minko | |
| 8,132,744 B2 | 3/2012 | King et al. | |
| 8,272,579 B2 | 9/2012 | King et al. | |
| 8,511,251 B2 | 8/2013 | Sato | |
| 8,522,711 B2 * | 9/2013 | McNeil | B05C 1/06 101/367 |
| 8,552,299 B2 | 10/2013 | Rogers et al. | |
| 8,720,370 B2 | 5/2014 | Rebstock | |
| 8,742,246 B2 | 6/2014 | Toyoda et al. | |
| 9,021,948 B2 | 5/2015 | Pattekar | |
| 2002/0053220 A1 | 5/2002 | Duthaler et al. | |
| 2005/0000231 A1 | 1/2005 | Lee | |
| 2006/0035033 A1 | 2/2006 | Tanahashi et al. | |
| 2009/0014046 A1 | 1/2009 | Yu et al. | |
| 2010/0154856 A1 | 6/2010 | Hiroyama et al. | |
| 2011/0017431 A1 | 1/2011 | Yang et al. | |
| 2011/0150036 A1 | 6/2011 | Lee et al. | |
| 2011/0154558 A1 | 6/2011 | Peter et al. | |
| 2012/0227778 A1 | 9/2012 | Leonov | |
| 2013/0087180 A1 | 4/2013 | Stark et al. | |
| 2014/0146116 A1 | 5/2014 | Paschkewitz | |

OTHER PUBLICATIONS

McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.

Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.

Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.

Francioso, L., "Flexible thermoelectric generator for ambient assisted living wearable biometric sensors", Journal of Power Sources, vol. 196, Issue 6, Mar. 15, 2011, pp. 3239-3243.

http://www.stacoolvest.com/, retrieved on Dec. 19, 2014.
http://www.steelevest.com/, retrieved on Dec. 19, 2014.
http://veskimo.com/, retrieved on Dec. 19, 2014.
http://glaciertek.com/, retrieved on Dec. 19, 2014.

Chen, A., "Dispenser-printed planar thick-film thermoelectric energy generators," J. Micromech. Microeng., 21(10), 2011.

Hewitt, A.B., "Multilayered Carbon Nanotube/Polymer Composite Based Thermoelectric Fabrics," Nano Letters, 12(3), pp. 1307-1310, 2012.

Arens, E., "Partial- and whole-body thermal sensation and comfort—Part I: Uniform environmental conditions," Journal of Thermal Biology, vol. 31, Issues 1-2, Jan. 2006, pp. 53-59.

Arens, E., "Partial- and whole-body thermal sensation and comfort—Part II: Non-uniform environmental conditions," Journal of Thermal Biology, vol. 31, Issues 1-2, Jan. 2006, pp. 60-66.

Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.

"Ortho-Planar Spring", BYI Mechanical Engineering Website, URL: http://compliantmechanisms.byu.edu/content/ortho-planar-spring, retrieved from the Internet on Dec. 23, 2014.

S.-J. Kim, J.-H Wea and B.-J. Cho: "A wearable thermoelectric generator fabricated on a glass fabric," Energy Environmental Science, 2014.

L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.

C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.

Sholin, V. et al.: "High Work Function Materials for Source/Drain Contacts in Printed Polymer Thin Transistors," Applied Physics Letters, vol. 92, 2008.

Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.

Chapter 15, "Ink Jet Printing", 14 pages, found at http://www.lintech.org/comp-per/151NK.pdf.

Marple, A. and Liu, Y.H.: "Characteristics of Laminar Jet Impactors", Environmental Science & Technology, vol. 8, No. 7, Jul. 1974, pp. 648-654.

Bailey, Adrian G.: "The Science and technology of electrostatic powder spraying, transport and coating", Journal of Electrostatics, vol. 45, 1998, pp. 85-120.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

Kelly, Ryan T, et al.: "The ion funnel: theory, implementations, and applications", Mass Spectrometry Reviews,vol. 29, 2010, pp. 294-312.

Crowe, Clayton et al.: "Multiphase Flows With Droplets and Particles", CRC Press, LLC, 1998.

Bhat, Pradeep P., "Formation of beads-on-a-string structures during break-up of viscoelastic filaments," Aug. 2010, vol. 6:625-631, Nature Physics, 7 pages.

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

(56) References Cited

OTHER PUBLICATIONS

Shi, X.D., "A Cascade of Structure in a Drop Falling from a Faucet," Jul. 8, 2004, vol. 265:219-222, Science, 4 pages.

* cited by examiner

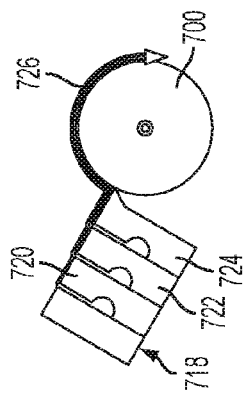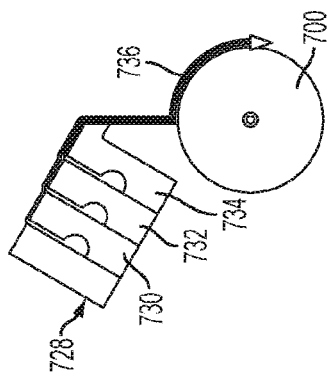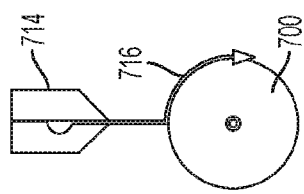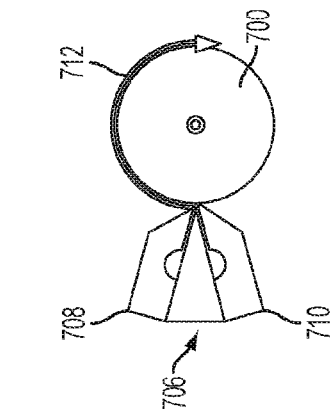
FIG. 7A  FIG. 7B  FIG. 7C  FIG. 7D  FIG. 7E

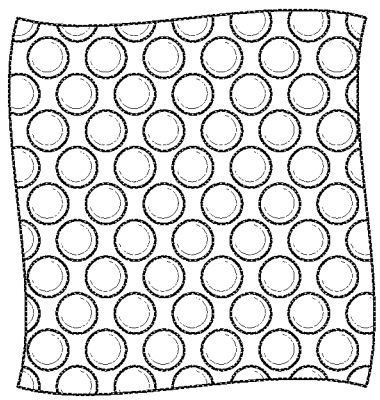
FIG. 15A
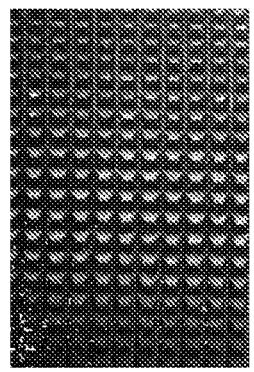 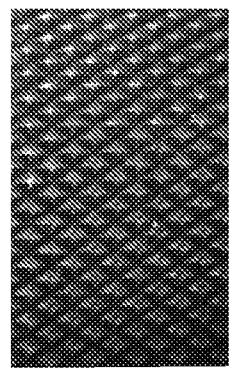
FIG. 15B          FIG. 15C

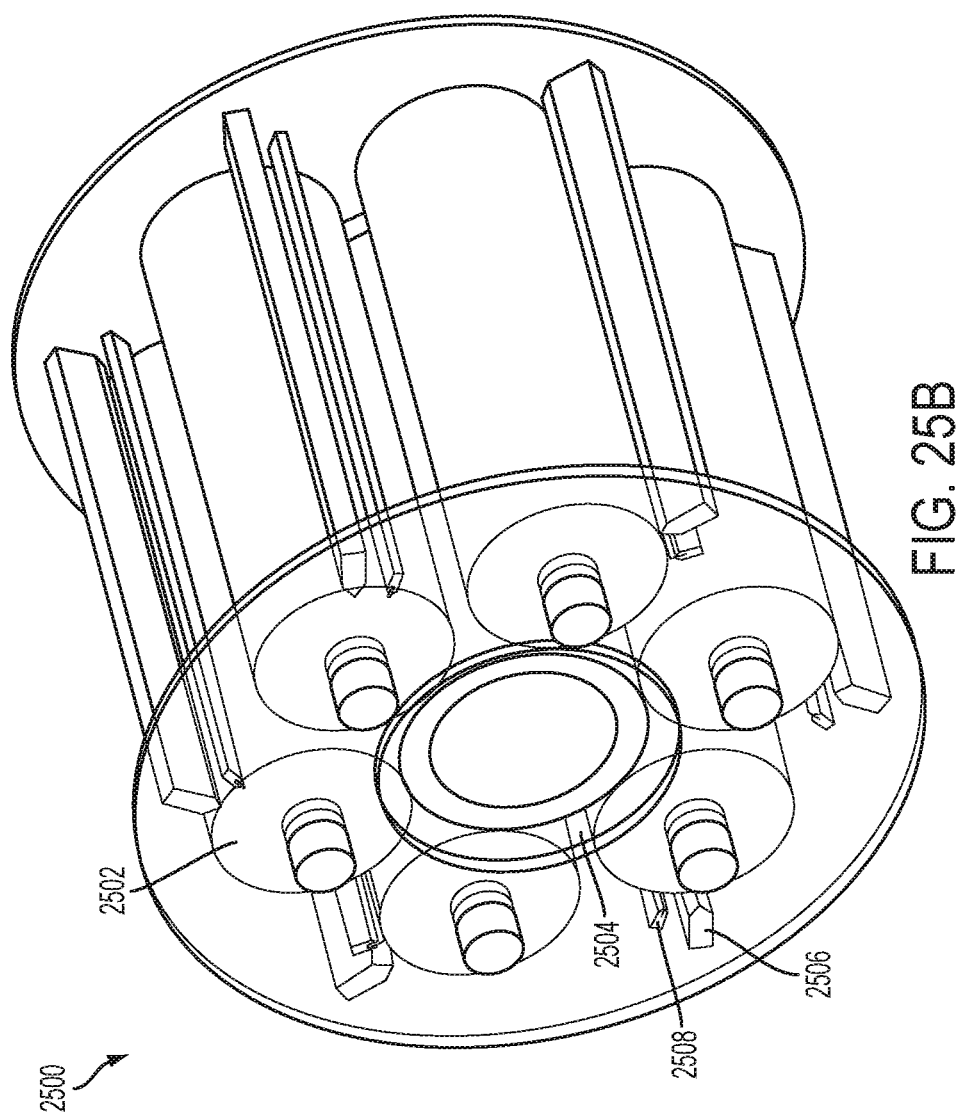

METHODS AND SYSTEMS FOR CREATING AEROSOLS

CROSS-REFERENCE TO RELATED APPLICATIONS

This application is related to co-pending U.S. patent application Ser. No. 14/066,418, entitled "METHODS AND SYSTEMS FOR CREATING AEROSOLS," filed on Oct. 29, 2013 and co-pending U.S. patent application Ser. No. 14/066,435, also entitled "METHODS AND SYSTEMS FOR CREATING AEROSOLS," filed on Oct. 29, 2013. Each of these applications is herein incorporated by reference in their entirety.

BACKGROUND

Many manufacturing and industrial applications benefit from fluid atomization to create a fine vapor mist or aerosol, such as the fuel/air mixture used in combustion applications, atomized air-paint mixtures for spray painting, application of coatings to pharmaceuticals, adhesive applications, and the like. Once a component solution is made into an aerosol it can be readily processed to coat virtually any shaped surface. Alternatively, in the pharmaceutical industry, aerosols are commonly used in a process called "spray-drying" to create fine powders that serve as upstream component solutions to create active pharmaceutical ingredients.

In all known applications, creating the aerosol from a component solution is challenging. When the component solution behaves like a Newtonian fluid, the creation of a vapor or aerosol is accomplished by a number of conventional methods. One conventional method uses high velocity air flows to entrain air and liquid. A typical atomizer or aerosol involves the coaxial flow of air and component solution at large Reynolds and Weber numbers, i.e., the inertial forces dominate the viscous and surface tension forces in the fluid. Such flows are generally unstable and lead to fluid break-up by Kelvin-Helmholtz and Plateau-Rayleigh instabilities. In many instances, the flow is turbulent and chaotic, which strips and stretches the fluid parcels at high strain and strain rates, which leads to the entrainment of large amounts of air with the fluid and results in a fine mist of drops suspended in the air.

High velocity coaxial flows are effective when the component solution has Newtonian properties and behaves like a Newtonian fluid. However, many component solutions contain a variety of macromolecular and interacting solids components that lead to non-Newtonian properties, including shear-thinning and viscoelasticity. Conventional methods of atomization like high velocity coaxial flows and electrospray can be ineffective for component solutions that have non-Newtonian properties. For example, if a component solution is viscoelastic and strongly extensionally thickening, its extensional viscosity can increase by several orders of magnitude in the straining direction when the fluid is stretched, i.e., greater than $10^5$ for some high molecular weight polymer component solutions.

During jetting, the extensional thickening of component solutions having non-Newtonian properties causes the viscous drag to overwhelm the inertial and surface tension forces, which allows the system to support large strain before breaking-up and preventing the formation of small drops. The jetting leads to the formation of long, sticky filaments, films, and tendrils that never break-up and become suspended in air. Essentially, the liquid stretches, but never breaks into droplets to form a mist or vapor.

The principal problem with coaxial flow systems to create aerosols is that the straining direction is coincident with the translation direction. The filament eventually breaks up into droplets to form a mist, but to achieve the large strain the filaments issuing from the jet must necessarily travel long distances. As the filaments travel, the filaments lose momentum and can recoil to reform large droplets. Alternatively, attempts to continually impel the filament during its trajectory require impractically long jetting to break the filaments and form droplets.

Therefore, methods and systems that create aerosols from fluids that show one or both of Newtonian and non-Newtonian properties would be beneficial in the art.

BRIEF DESCRIPTION OF THE DRAWINGS

FIGS. 7A-7E are additional examples of fluid coating techniques for a pair of counter-rotating rollers.

FIGS. 15A-15C are example textures for one or both of the counter-rotating rollers.

FIGS. 25A and 25B are still another example system for creating aerosols with multiple rollers and a three-dimensional perspective view thereof.

DETAILED DESCRIPTION

Systems and methods for creating aerosols are disclosed in which fluid filaments are stretched and break-up into droplets that create an aerosol, mist, or other vapor. Aerosols, mists, and vapors are interchangeable terms used to describe one or more droplets of fluid filaments that become suspended in air. The fluids are often liquids, having either Newtonian or non-Newtonian properties. Generally, fluids having non-Newtonian properties can have strong extensional thickening, which cause their extensional viscosity to increase significantly, sometimes several orders of magnitude, in the straining direction when strained. The extensional thickening of non-Newtonian fluids causes viscous drag that overwhelms the inertial and surface tension forces of the fluid and allows the system to support large strain before breaking-up and preventing the formation of small drops or droplets.

If strained and stretched enough along an appropriately long strain pathway, all fluids, including fluids having Newtonian and non-Newtonian properties, eventually break-up into small droplets and form a mist or aerosol. All fluids can be continually stretched to form fluid filaments (stretched fluid) until the fluid filaments break into several droplets thus forming a mist or aerosol.

The process of straining and stretching fluid filaments can be repeated with excess fluid remaining after the first round of droplets have been formed or with new fluid. Further, multiple fluid filaments can be stretched in parallel with the first fluid filament stretching and straining process thus increasing the volume of the formed droplets. The amount of time between stretching the first fluid filament and any additional excess fluid filaments can be defined by a time period that may be adjusted or controlled, as desired. The time periods between multiple stretching and breaking of fluid filaments can be variable or can be constant.

Figure 1:
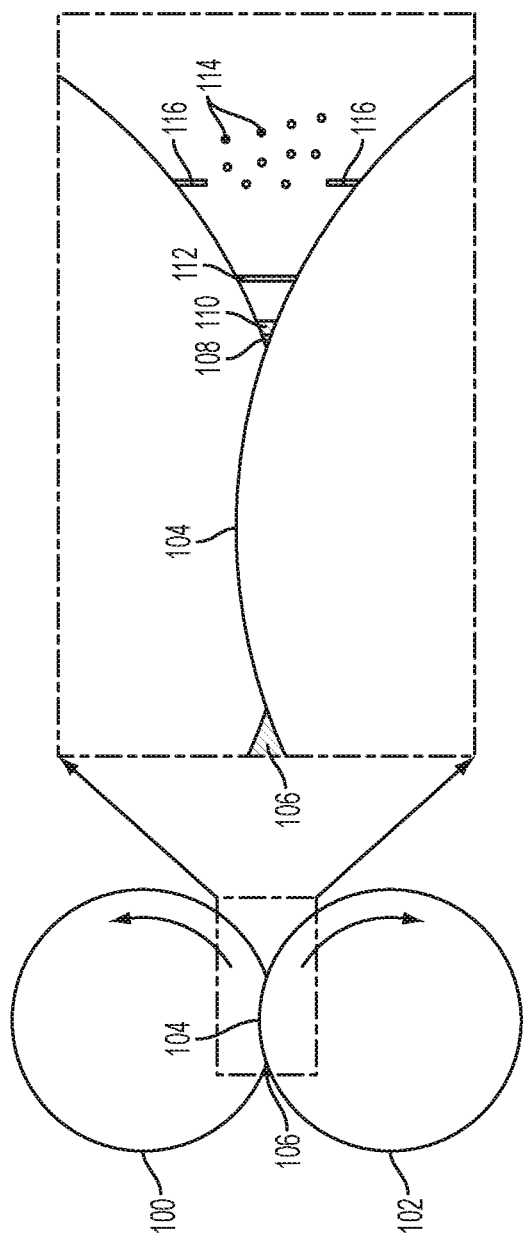
FIG. 1 is a progressive illustration of fluid being drawn through a nip defined between two rollers and a fluid filament stretching, according to aspects of the disclosure.

FIG. 1 shows a progression of fluid that is stretched by a pair of counter-rotating rollers 100, 102. A nip 104 is defined as the space between the two rollers 100, 102 into which the fluid is drawn when the rollers 100, 102 counter-rotate. The fluid pools at an upstream side 106 of the nip 104 and is drawn through the nip 104. On a downstream side 108 of the nip 104, the fluid is stretched between the surfaces of the two rollers 100, 102 into a fluid filament 110. As the rollers 100, 102 counter-rotate, the surfaces of the rollers 100, 102 to which the fluid filament 110 adheres remains the same, but the space between such surface is greater. The fluid filament 112 grows longer and thinner as the surfaces of the rollers 100, 102 rotate away from each other. When the fluid filament 112 reaches a point of the liquid bridge becoming unstable, which is also the capillary break-up point for the fluid filament 112, the fluid filament 112 breaks up into several droplets 114 and leaves excess fluid 116 behind on each of the roller's surface. The excess fluid 116 retracts to the surface of its respective roller and can be part of the fluid that pools and is drawn through the nip on the next rotation of the rollers. The process can be repeated to provide a continuous mist.

Figure 2:
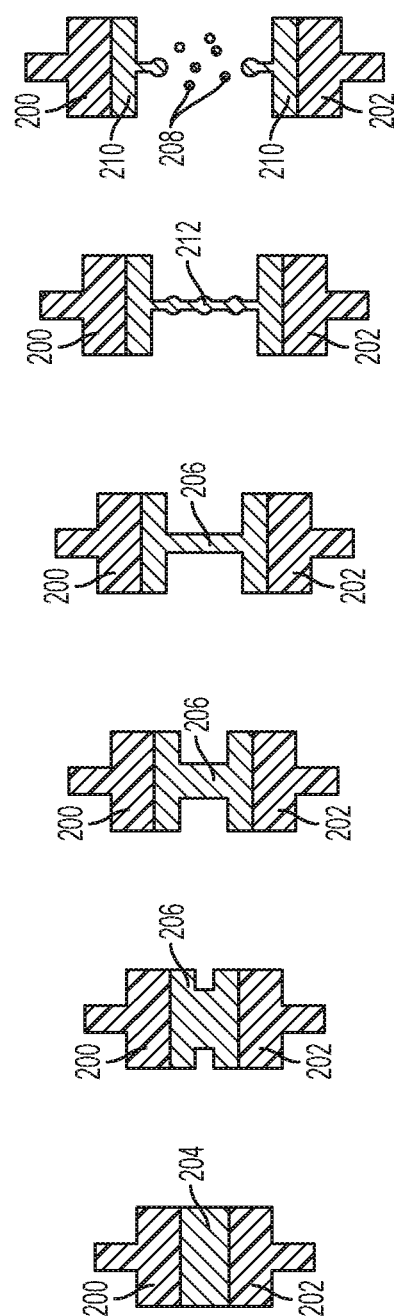
FIG. 2 is an example of a pair of pistons between which fluid is stretched and breaks.

FIG. 2 shows a progression of fluid 204 that is stretched between a pair of pistons 200, 202 to form a fluid filament 206 that eventually breaks up into a plurality of droplets 206. Fluid 204 is placed between the pistons 200, 202. The pistons 200, 202 are pulled apart and a continuous strain is applied to cause the fluid 204 to stretch between the pistons 200, 202 and form a fluid filament 206. As the fluid filament 206 grows longer and thinner, the fluid filament 206 eventually reaches its capillary break-up point at which it breaks into multiple droplets 208 and leaves excess fluid 210 behind on the surface of each piston 200, 202. FIG. 2 also shows a beads-on-a-string structure 212, which is the precursor to fluid filament 206 reach its capillary break-up point at which time the droplets 208 form. Excess fluid 210 is pooled on the pistons 200, 202 and the pistons 200, 202 can be brought back together and the fluid stretched again, thereby repeating the process and forming additional mist droplets.

Figure 3:
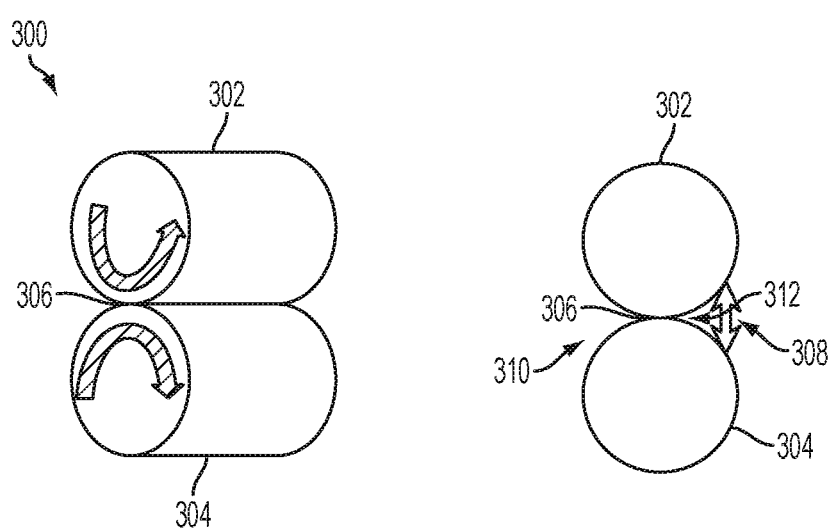
FIG. 3 shows a pair of counter-rotating rollers and a filament formed on a downstream side of the nip, in accordance with aspects of the disclosure.

FIG. 3 shows an example pair of counter-rotating rollers 302, 304. The rollers 302, 304 define a nip 306, which is the region between the rollers. In some examples, the nip is defined by the space between rollers that are physically spaced apart. In other examples the nip 306 is defined between the rollers physically touching each other. In yet other examples, the rollers have a flexible surface material that compresses when the rollers contact each other at the nip.

The nip 306 has an upstream side 310 and a downstream side 312. Fluid coating the roller(s) pools on the upstream side 310 of the nip 306. The fluid is drawn through the nip 306 to the downstream side 312 and stretched to form a fluid filament 308. The fluid filament 308 has a continuous and increasing strain applied to it on the downstream side, which causes the fluid filament 308 to grow longer and thinner as the strain is increased and the surfaces of the rollers 302, 304 are pulled farther apart. In the example shown in FIG. 3, the strain applied to the fluid filament 308 is increased because of the counter-rotation of the rollers 302, 304—the fluid remains attached to the same location on the surfaces of the rollers and the rollers counter-rotate, which causes a greater distance between the rollers' surfaces as the rotation occurs, thereby stretching the fluid filament until it breaks.

FIG. 4 shows a more detailed view of an aerosol creation system 400 having a pair of counter rotating rollers 402, 404. Similar to FIG. 3, the pair of counter-rotating rollers 402, 404 of FIG. 4 define a nip 406 therebetween and they counter-rotate with respect to each other. The rollers 402, 404 are both coated with a fluid 412, 414, respectively. The fluid 412, 414 extends around the entire circumference of each roller 402, 404. Some portion of the fluid 412, 414 on one or both rollers 402, 404 could partially dry-off leaving areas of the roller surface(s) without a fluid coating. Alternatively, the fluid can coat only one of the pair of rollers that could also experience some partial dry-off areas, in other examples.

Figure 4:
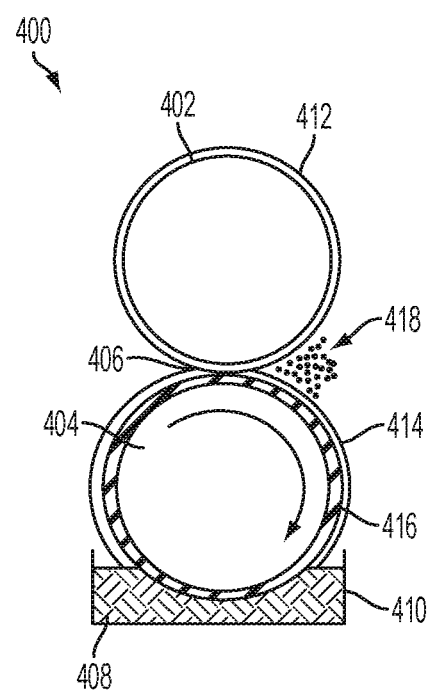
FIG. 4 is a cross-sectional view of an exemplary pair of counter-rotating rollers with a fluid reservoir.

In FIG. 4, a portion of the lower roller 404 is submerged in a coating pan 408 that contains the fluid 410 that coats the lower roller 404. The lower roller 404 also has a rubber layer 416 that enables a negative gap to be implemented between the lower roller 404 and the upper roller 402. The negative gap between the two rollers 402, 404 causes the fluid to be reversibly compressed between the rollers 402, 404. The rubber layer 416 also encourages the fluid 410 to adhere to the roller 404 surface. The rubber layer 416 is rubber in this example, but can be any other suitable material that helps the fluid adhere to the roller in other examples.

Between the pair of counter-rotating rollers 402, 404 is a nip 406. In this example, the nip squeezes the fluid layers 412, 414 between the two rollers 402, 404 at a controlled fluid thickness. The controlled fluid thickness can be adjustable in some examples or can be fixed in other examples. Controlling the fluid thickness controls the volume of and manner in which the droplets 418 of the mist are formed on the downstream side of the nip 406. As discussed above regarding FIG. 1, the fluid can pool at the upstream side of the nip 406 before it passes through the nip 406. The pooling of fluid in the example shown in FIG. 4 can be a combination of the fluid from both rollers 402, 404.

Figure 5:
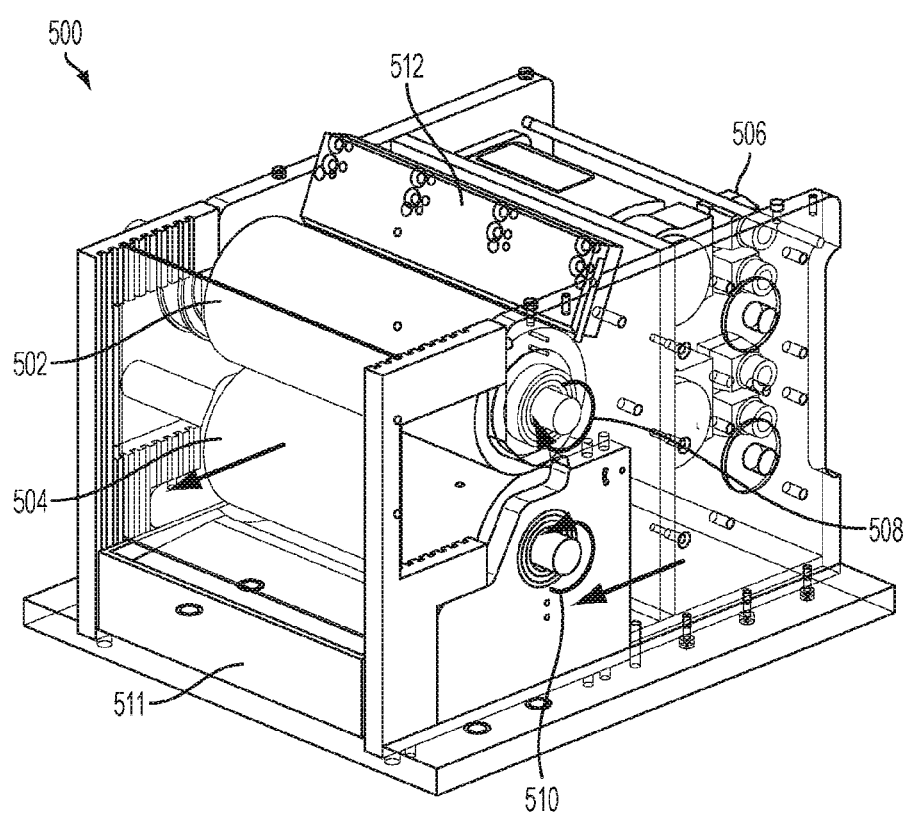
FIG. 5 is an example of an aerosol creation machine having a pair of counter-rotating rollers that create aerosol.

FIG. 5 shows an example of an aerosol creation system 500 having a pair of counter-rotating rollers 502, 504 as a strain element that stretches the fluid. A driving element, such as the motors 506 shown in FIG. 5, drive the pair of counter-rotating rollers 502, 504 to rotate in counter-rotation with respect to each other, as indicated by the arrows 508, 510 in FIG. 5. A fluid source 511, such as a reservoir with liquid in it, coats one or both of the rollers 502, 504 with a fluid. A film of fluid forms on the surface(s) one or both of the rollers 502, 504. A metering blade 512 or other film thickness control mechanism may be included in the filament creation system 500 to control the thickness of the film on the roller(s) 502, 504. The metering blade 512 either contacts, as shown in FIG. 5, or comes into near contact with one or both of the rollers 502, 504 to control the thickness of the film of fluid on the roller(s) 502, 504.

As discussed above, when the rollers counter-rotate with respect to each other, the fluid coating one or both of the rollers is drawn into a nip defined between the rollers. The fluid filament stretches on a downstream side of the nip and breaks into droplets to form the mist on the downstream side of the nip. The fluid filament breaking into droplets flows in a direction that is away from the rollers themselves. A harvesting element can be positioned to collect mist that is formed by the fluid coating being drawn through the nip of the rollers. The mist is a collection of the droplets that are formed by the fluid filaments breaking.

Figure 6B:
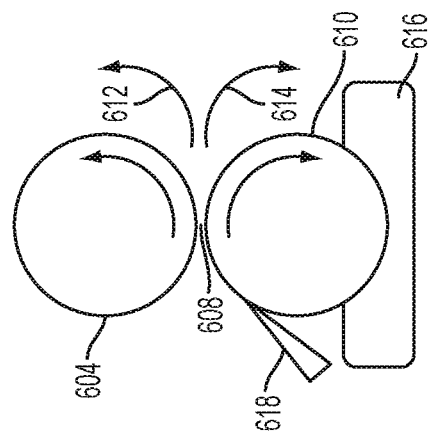
FIGS. 6A and 6B are two examples of fluid coating techniques for a pair of counter-rotating rollers.
Figure 6A:
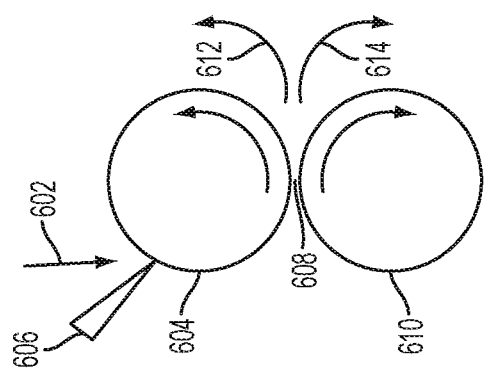

FIGS. 6A and 6B show two different types of fluid coating techniques for aerosol creation systems having a pair of counter-rotating rollers that stretch the fluid. FIG. 6A includes a fluid feed 602 that is directed to cause the fluid to contact the top roller 604 of the pair of counter-rotating rollers. The fluid feed 602 causes the fluid to contact the top roller 604 near where a metering blade 606 also contacts the top roller 602, in this example. The metering blade 606 controls the thickness of the fluid that adheres to the surface of the top roller 604. The fluid forms a fluid film around the circumference of the surface of the top roller 604 as the top roller 604 rotates in a counter-clockwise motion and the metering blade 606 sets a maximum thickness for the fluid film based on how close it is positioned to the surface of the top roller 604 in this example or either or both rollers in alternative examples.

The counter-rotation of the rollers 604, 610 draws fluid through a nip 608 formed between the top roller 604 and the bottom roller 610. The bottom roller 610 rotates in a clockwise motion, which thereby draws the fluid film through an upstream end of the nip 608. Air flow pathways 612, 614 on the downstream side of the nip 608 have a pathway that is parallel to the rotating motion of each respective roller, e.g., for the top, counter-clockwise rotating roller 604, the airflow pathway 612 is parallel to the counter-clockwise rotation of the top roller 604 and for the bottom, clockwise rotating roller 610, the airflow pathway 614 is parallel to the clockwise rotation of the bottom roller 610.

FIG. 6B shows another roller coating technique for the same pair of counter-rotating rollers 640, 610 shown in FIG. 6A in which the fluid source is a pan or reservoir 616 with fluid in it. The reservoir 616 is positioned so that a portion of the bottom roller 610 is submerged in and travels through the fluid in the pan 614 when it rotates, which encourages or causes fluid to adhere to the surface of the bottom roller 610. The metering blade 618 is positioned to contact or nearly contact the bottom roller 610 and control the thickness of the fluid film that adheres to the surface of the bottom roller 610 by defining a maximum thickness through which the fluid passes. The airflow pathways 612, 614 are the same or similar for the counter-rotating rollers for both coating techniques shown in FIGS. 6A and 6B.

The nip 608 shown in the FIGS. 6A and 6B examples includes a gap or space between the two rollers 604, 610 such that the rollers 604, 610 are positioned adjacent to, but not in direct contact with each other. The narrow gap formed by the nip 608 still causes the fluid filaments to stretch on the downstream end of the nip 608 and break into droplets to form a mist or aerosol.

FIGS. 7A-7E show alternative coating techniques for applying fluid to the roller(s) of strain elements having a pair of counter-rotating rollers. In these examples, a single roller 700 is shown for clarity, although the rollers are part of a pair of counter-rotating rollers. FIG. 7A shows a fluid source 702 that is applying a slot bead coating to the roller 700. The fluid source 702 is positioned to apply the fluid to the surface of the roller 700 on an upstream side of and approximately midway along the height of the roller 700. The fluid source 702 is in contact or near contact with the surface of the roller 700 in this example. The fluid 704 coats the circumference of the roller 700.

FIG. 7B has a fluid source 706 having a first fluid 708 and a second fluid 710 that apply a multi-layer slot bead coating to the roller 700. Similar to the single-layer slot bead coating technique discussed in FIG. 7A, the fluid source 706 is positioned to apply the fluid to the surface of the roller 700 on an upstream side of and approximately midway along the height of the roller 700 and is in contact or near contact with the surface of the roller 700. However, in this example, the fluid source 706 includes a first fluid 708 and a second fluid 710 that are overlaid on each other and are applied as a multi-layer fluid 712 to the surface of the roller 700. The multi-layer fluid 712 coats the circumference of the roller 700.

FIG. 7C shows a slot curtain coating technique in which the fluid source 714 is positioned above and approximately midway along with width of the roller 700. The fluid source 714 is also spaced apart from the roller 700 and does not come into physical contact with the surface of the roller 700 in applying the fluid to the roller 700, which causes the fluid to travel a distance through the air before contacting the roller 700. The fluid pathway 716 extends around the circumference of the roller in a similar fashion to the other alternative coating techniques discussed above in FIGS. 7A and 7B.

FIG. 7D shows a slide bead coating technique in which the fluid source 718 includes a first fluid 720, a second fluid 722, and a third fluid 724 that together create a multi-layer fluid 726 that adheres to the surface of the roller 700. The fluid source 718 is positioned on a side of and is tilted at an angle with respect to the roller 700 such that when each of the first fluid 720, the second fluid 722, and the third fluid 724 are dispensed, they run into each other and form the multi-layer fluid 726. The fluid source 718 in this example is positioned to dispense the fluid 726 either in contact or in near contact with the roller 700. Similar to the other examples discussed above, the fluid pathway of the fluid 726 extends around the circumference of the roller 700.

FIG. 7E shows a slide curtain coating technique in which the fluid source 728 includes a first fluid 730, a second fluid 732, and a third fluid 734 that together create a multi-layer fluid 736 that adheres to the surface of the roller 700. The fluid source 728 is positioned to a side of and is tilted at an angle with respect to the roller 700 such that when each of the first fluid 730, the second fluid 732, and the third fluid 734 are dispensed, they run into each other and form the multi-layer fluid 736. The fluid source 728 is spaced apart from the surface of the roller 700 and does not come into physical contact with the surface of the roller 700 in applying the fluid 736 to the roller 700, which causes the fluid 736 to travel a distance through the air before contacting the roller 700. The fluid pathway extends in the direction perpendicular to the point of contact between the fluid 736 and the roller 700 and coats the roller 700 around its circumference.

Any suitable coating technique(s) can be used to apply fluid to the surface of a roller and the above discussed coating techniques are not designed to limit the disclosure in any way. For example, the fluid can be applied at any suitable angle and in any suitable location with respect to the roller(s). The fluid can be dripped on to one or both rollers or can be directly applied to the roller's surface. The fluid can be applied on the upstream or downstream side of the nip, although in the above examples, the rollers are round and any application of fluid on the downstream side of the nip coats the roller on the downstream side and the roller's rotation causes the fluid to enter the nip on the upstream side of the nip.

FIGS. 8-12 are example configurations for aerosol harvesting systems, each having some aid in forming the droplets of the aerosol or in directing the mist of the aerosol. Each of FIGS. 8-12 include a pair of counter-rotating rollers 800, 802, a fluid source 804, and a metering blade 806. In another example, an electric field can be applied to or near the nip to encourage the formation of droplets from the fluid filaments.

Figure 8:
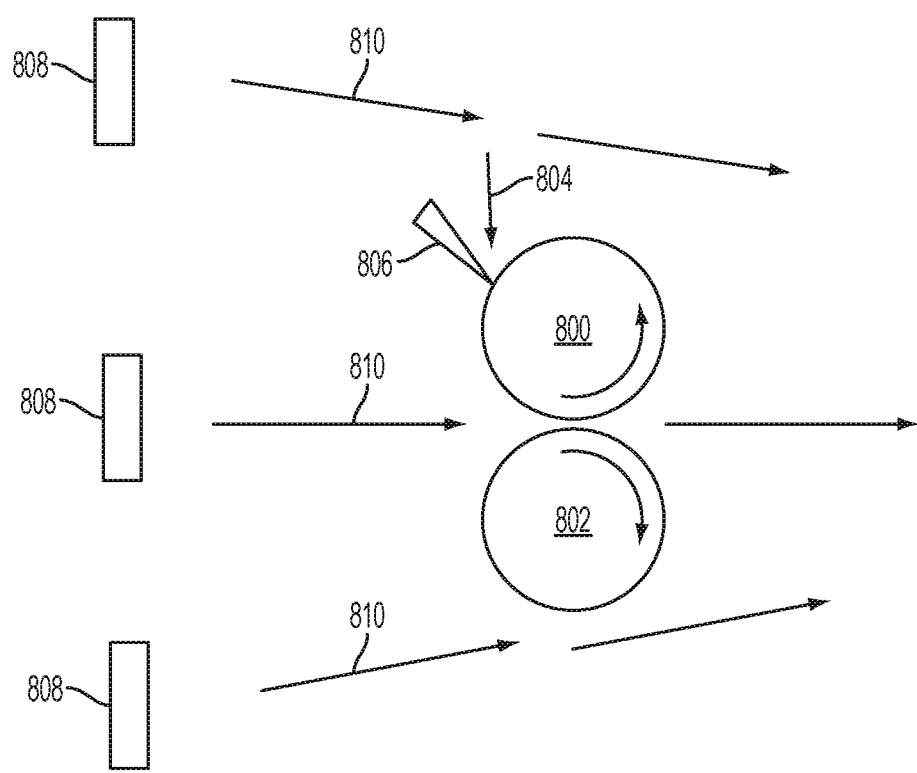
FIG. 8 is an example a system for creating aerosols that includes fans to create air flow upstream of the pair of counter-rotating rollers.

In FIG. 8, the aerosol creation system also includes three fans 808 with respective air flow pathways 810 that encourage the fluid filaments to stretch and break into droplets on the downstream side of the nip between the rollers and to encourage the formed mist or aerosol to travel in the direction of the air flow 810. Alternatively, the fans can be replaced with any suitable compressed air source or any pressure source that is able to encourage fluid filaments to stretch and break into droplets.

Figure 9:
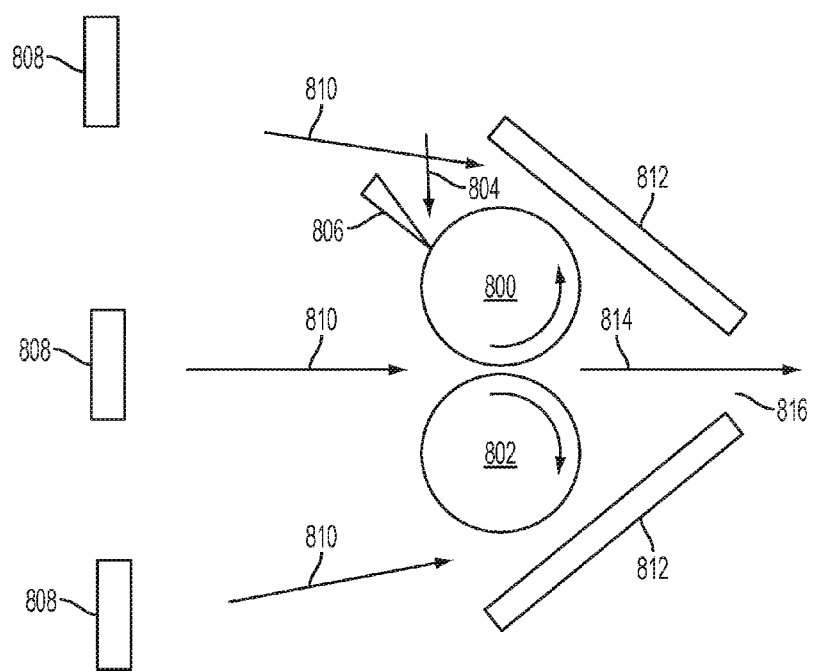
FIG. 9 is the system for creating aerosols shown in FIG. 8 with the addition of baffles that are positioned downstream of the pair of counter-rotating rollers.
Figure 10:
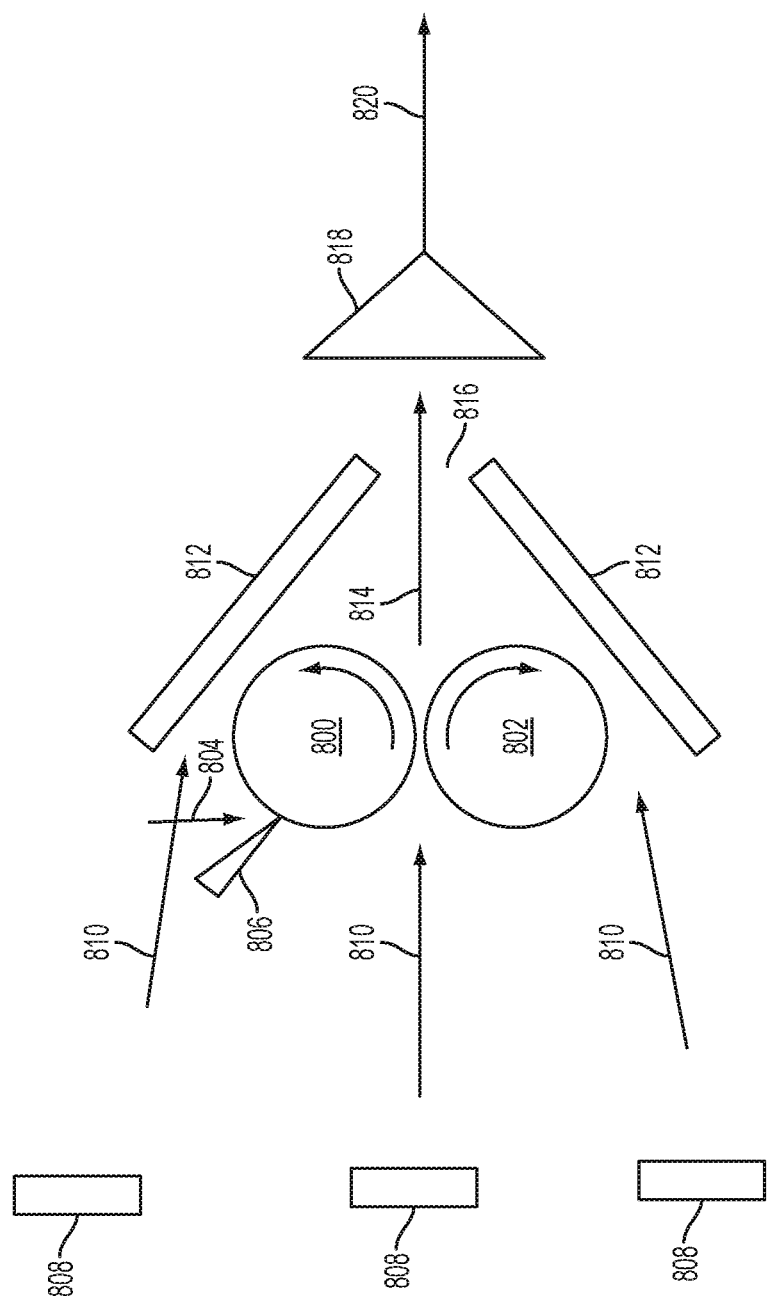
FIG. 10 is the system for creating aerosols shown in FIG. 9 with the addition of a spray collector and a vacuum that are positioned downstream of the pair of counter-rotating rollers and the baffles.
Figure 11:
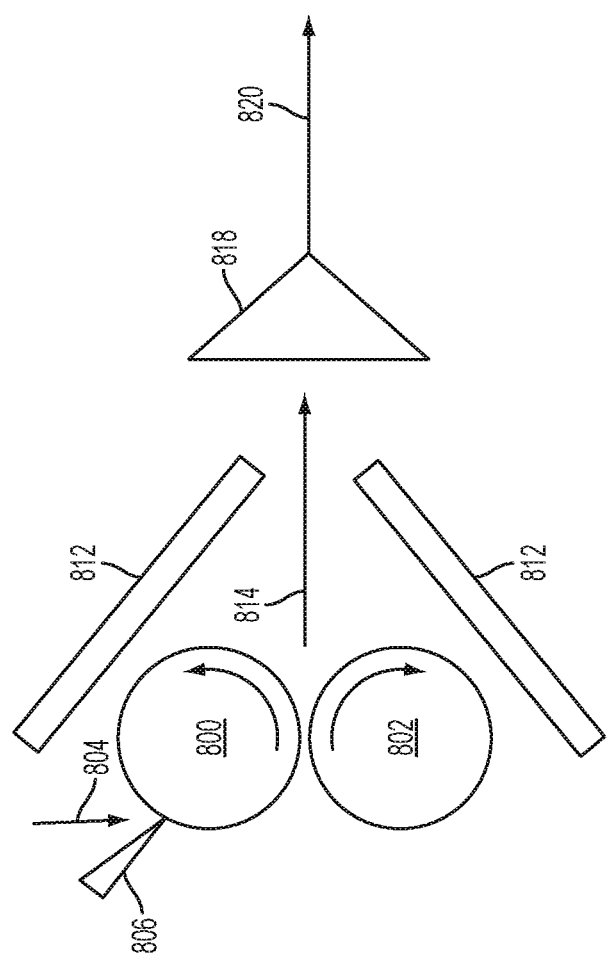
FIG. 11 is an example system for creating aerosols that includes air flow that is positioned upstream of the pair of counter-rotating rollers and baffles, a spray collector, and a vacuum that are positioned downstream of the pair of counter-rotating rollers.

FIG. 9 shows the aerosol creation system shown in FIG. 8 with the addition of two baffles 812 positioned on the downstream side of the nip and are angled with respect to the rollers 800, 802. The baffles 812 guide the formed aerosol into a pathway 814 that travels through an opening 816 formed between the two baffles 812. FIG. 10 is the aerosol creation system shown in FIG. 9 with the addition of an aerosol collector 818 and a vacuum 820. The aerosol collector 818 is an element that gathers the droplets of the aerosol into a container of any suitable type. The vacuum 820 may be applied to help encourage the droplets of the aerosol to travel into the aerosol collector 818 or to otherwise guide the aerosol in a desired direction or along a desired pathway. FIG. 11 is the same aerosol creation system shown in FIG. 10, but with the fans removed.

Figure 12:
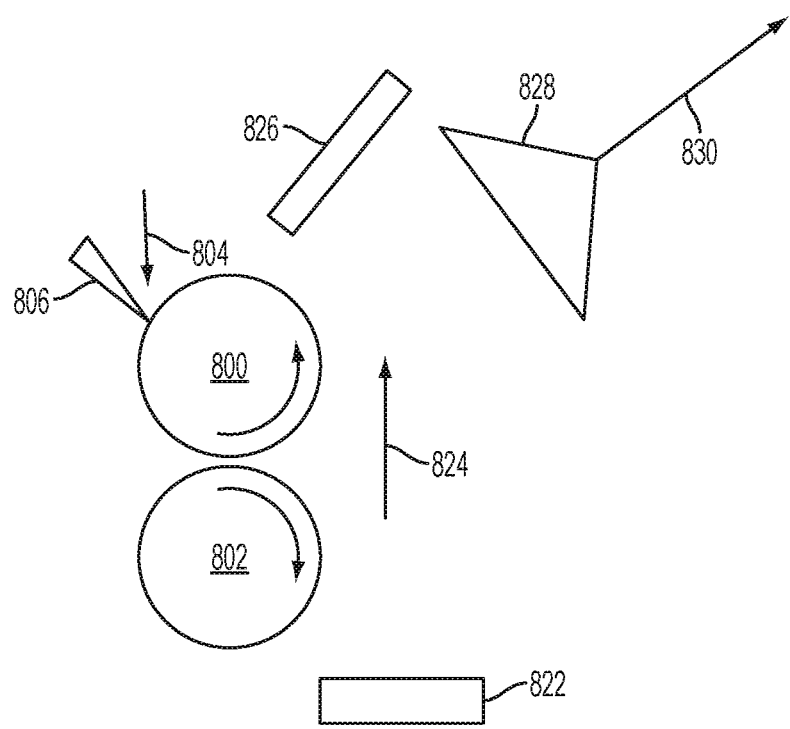
FIG. 12 is another example system for creating aerosols that includes a fan positioned below the pair of counter-rotating roller, a baffle positioned above the counter-rotating rollers, and a spray collector and vacuum positioned downstream of the counter-rotating rollers.

FIG. 12 is yet another aerosol creation system having a pair of counter-rotating rollers 800, 802, a fluid source 804, and a metering blade 806. In the example shown in FIG. 12, a fan 822 is positioned on the downstream side and below the pair of rollers 800, 802 and causes an air flow pathway 824 that is perpendicular to the direction in which the aerosol is directed away from the rollers 800, 802. The air flow pathway 824 directs the aerosol toward a baffle 826 that in turn directs the aerosol into an aerosol collector 828. A vacuum 830 may be applied to the aerosol collector 828 to encourage the aerosol to travel into the aerosol collector 828 in one configuration. In another configuration, the air stream runs through one or both of the rollers and is expelled radially through one or both of the rollers or a portion thereof.

Figure 13:
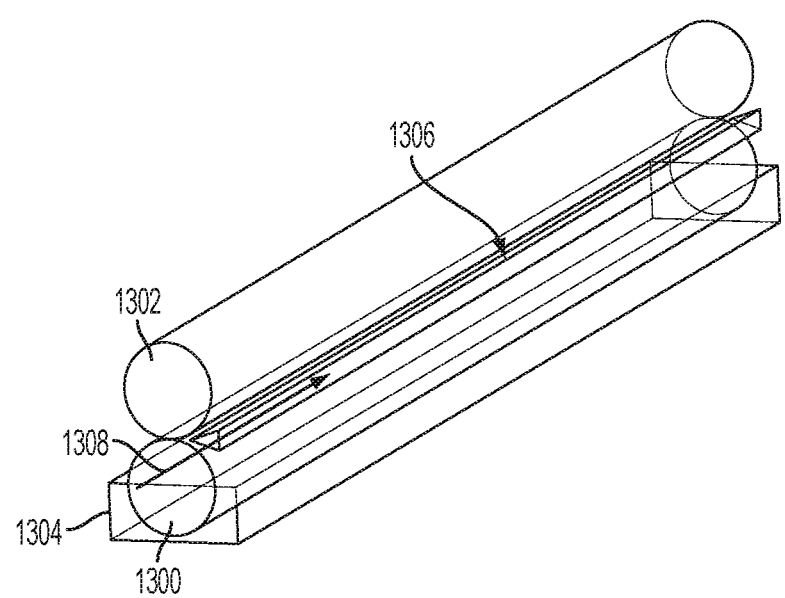
FIG. 13 is yet another example system for creating aerosols that includes an air stream that travels parallel to the counter-rotating rollers along the nip defined between the rollers.

FIG. 13 shows still another aerosol creation system that includes a pair of counter-rotating rollers 1300, 1302. The bottom roller 1302 is partially submerged in and positioned to rotate through liquid in a reservoir 1304. An air stream 1308 flows toward the droplets formed by the fluid break-up 1306 at the downstream side of the nip, approximately parallel with the length of the rollers 1300, 1302.

Figure 14:
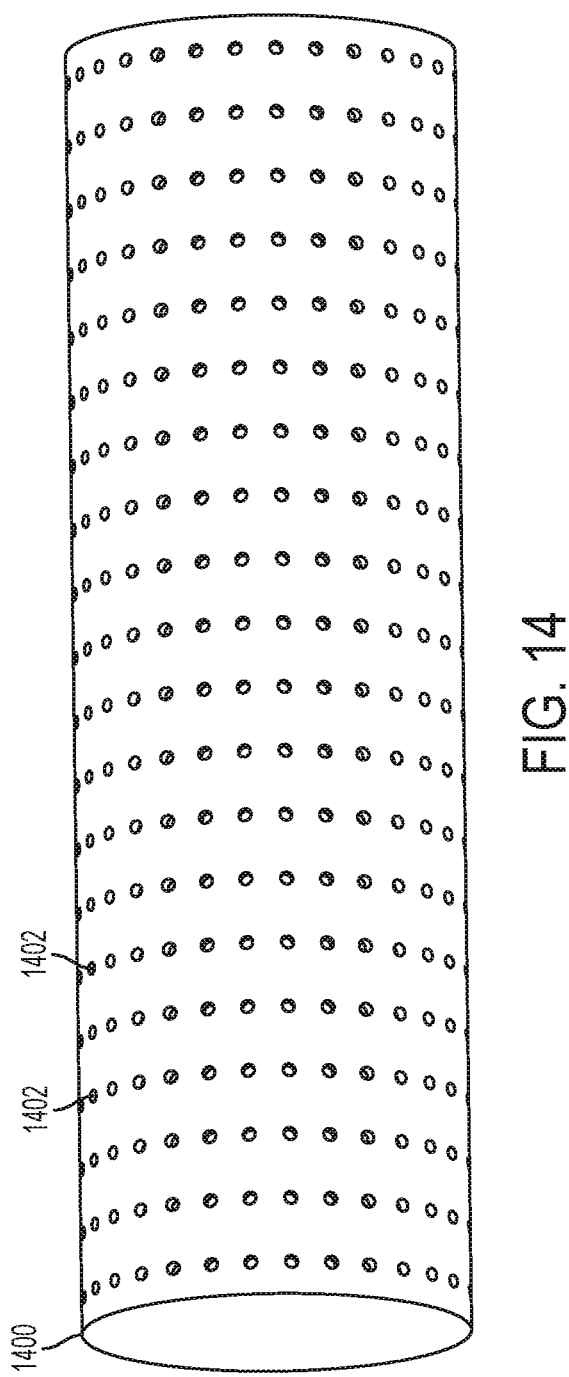
FIG. 14 is an example roller of a counter-rotating roller showing various openings on the roller surface.
Figure 16:
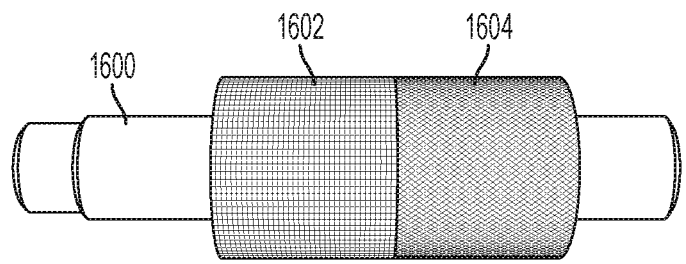
FIG. 16 is one of the counter-rotating rollers having two regions of different textured surfaces.

FIG. 14 shows a roller 1400 having a plurality of openings 1402 in its surface. The holes draw the fluid into the openings 1402 and control the manner in which the fluid filaments are formed (i.e., the size of the fluid filaments, which also controls the size of the mist droplets), which regulates the manner in which the fluid filament break-up occurs and the resulting formation of the mist. The openings 1402 can also improve the fluid adhering to the surface of the roller 1400. Further, the openings 1402 can be either holes through the surface of the roller that extend into the interior of a hollow roller or can be openings with a floor, such as a cavity extending inward from the roller surface. The openings 1402 increase the surface area to which the fluid adheres to the roller surface. Having areas of increased fluid volume, such as in the areas where the fluid pools in the openings 1402 shown in FIG. 14, increases the volume of fluid that can be stretched when the rollers counter rotate, which in turn increases the amount of droplets that are formed from the fluid filaments reaching their point of capillary break-up. One or both rollers can include the openings shown in FIG. 14. The openings 1402 can be in any suitable configuration and can be any suitable shape and size.

FIGS. 15A-15C show various textures that can be applied to the surfaces of one or both rollers. The textures can be formed integrally with the surface of the rollers or can be applied as a layer on top of the surface of the rollers. FIG. 15A shows a textured roller surface having multiple dimples. FIGS. 15B and 15C show textured roller surfaces having patterned raised elements. The textured surface(s) of the roller(s) increase the surface area of the roller to which the fluid adheres and can shape or otherwise alter the thickness, shape, flow, angle of adhering, or the like between the fluid and the surface of the roller.

Figure 17:
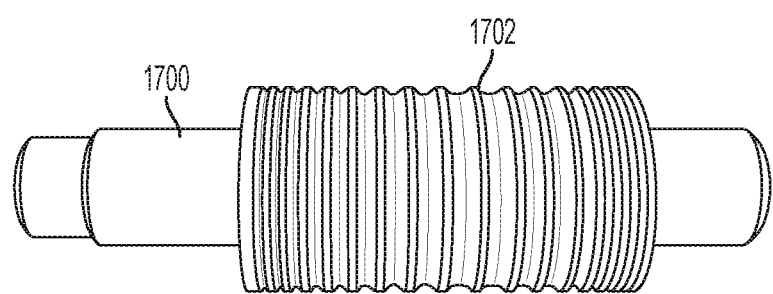
FIG. 17 is yet another example textured surface for a counter-rotating roller in which ribs spaced apart at varying distances extend around the circumference of the roller.
Figure 18:
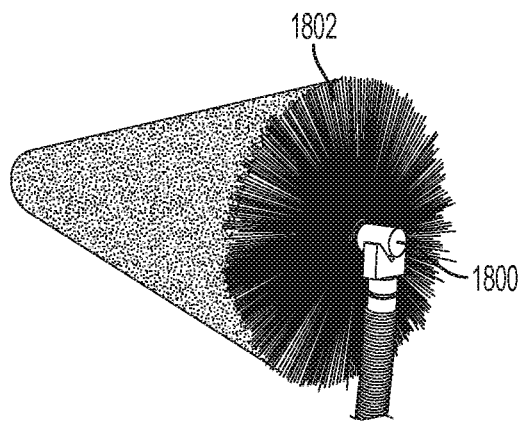
FIG. 18 is still another type of textured roller surface in which a plurality of bristles extends away from the surface of the roller.

FIG. 1600 shows a roller 1600 with a textured surface in which a first portion 1602 of the textured surface has a first texture and a second portion 1604 of the textured surface has a second texture that is different from the first texture. FIG. 17 shows yet another roller 1700 with a textured surface that includes a plurality of ribs 1702 that extend around the circumference of the roller and are spaced apart at various distances from each other. FIG. 18 is still another example roller 1800 having multiple bristles 1802 that extend away from the surface of the roller 1800.

Figure 19:
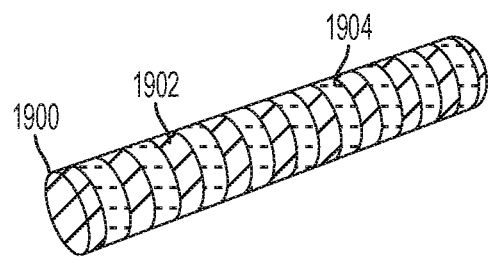
FIG. 19 is an example roller having two surface treatments applied to its surface in different regions.

FIG. 19 is yet another roller 1900 that has a first region 1902 that is treated with a first surface treatment to change the angle at which the fluid contacts the roller 1900 and a second region 1904 that is treated with a second surface treatment that changes the angle at which the fluid contacts the roller 1900 in a manner different from the first surface treatment. In other examples, only a single surface treatment is applied to the roller that changes the angle at which the fluid contacts the roller.

The texture and/or the treatment applied to the rollers can be selected based on the characteristics of the fluid that is aerosolized to customize the aerosol creation process to each fluid and provide the most efficient manner for aerosolizing the fluid among other reasons. In some examples, the textured surface of one or both of the rollers varies the thickness of the fluid coating that adheres to the surface of the roller. Such a textured surface can help vary the thickness of the fluid film in a manner that increases the efficiency of the fluid filament breaking into droplets by varying the concentration of the fluid in target regions.

The rollers can include any suitable materials such as steel or other metal(s), plastics, rubbers, or the like. The rollers or any portions thereof also can be a single material or may be any number of multiple materials. For example, a roller can have a core material that is coated with or includes a surface layer of a material that is softer than the core material. In some examples, the surface layer material encourages the fluid to adhere to the roller or may encourage the fluid to adhere to the roller at a different angle or in a different way than would occur without the surface layer material.

The orientation of the fluid source with respect to the rollers can be any desirable position. Some of the above examples discuss an air flow source that directs the droplets forming the mist or aerosol in a particular direction. The air flow source can be any gas source and is not limited to air. For example, the gas source can be positioned to cause gas to flow on either side of, above, or below the nip to encourage or cause the formation of droplets from breaking of the fluid filaments. Alternatively, the gas source can be positioned to cause gas to run through one or both rollers so the gas is expelled radially from the roller(s).

The formed mist can be directed to form an aerosol of various geometries. Any desirable geometrical shape can be formed, depending on how the mist is directed. The geometry can be any shape, such as a rectangle, cone, or conical shape and the size and contour of such shapes can be controlled by altering the volume and concentration of the aerosolized fluids.

The above two-roller and piston configuration aerosol creation systems include a pair of rollers or pistons that produce an associated concentration of fluid mist. Some disclosed methods of increasing the concentration of the mist include parallelizing the systems and creating a greater concentration of stretched fluid filaments and thus the produced mist. FIGS. 20A-26B shows some example systems 2000, 2100, 2200, 2300, 2400, 2500, 2600, their associated three-dimensional views, methods of producing higher concentrations of the fluid mist and include systems and methods with multiple rollers and their respective diverging surfaces.

The example multi-roller systems and methods have a first roller and a first diverging surface and a second roller and a second diverging surface. A first nip is defined between the first roller and the first diverging surface and a second nip is defined between the second roller and the second diverging surface. Each nip has an upstream side and a downstream side, in a similar manner as discussed above in regards to the two-roller and piston example systems. Fluid is drawn through each nip toward the downstream sides of each nip. The fluid is stretched into fluid filaments on the downstream sides of each nip between the surface of the respective roller and the respective roller's diverging surface. The stretched fluid filaments are caused to break into a plurality of droplets in the same manner discussed above regarding the two-roller/piston systems, e.g., by overcoming the fluid's capillary break-up point and causing the fluid filament to break into a plurality of droplets. The plurality of droplets form a mist that can be harvested or directed in any manner disclosed herein.

In some examples, the first diverging surface and the second diverging surface are other rollers, such as the examples shown in FIGS. 20A, 20B, 21A, and 21B. In other examples, the first diverging surface and the second diverging surface are a contiguous ring, positioned in an interior space within rollers configured in a circular pattern or positioned to extend along an exterior diameter of rollers configured in a circular pattern, such as the examples shown in FIGS. 22A, 22B, 23A, 23B, 24A, 24B, 25A, and 25B. In still other examples, the first diverging surface and the second diverging surface are a belt that surrounds the multiple rollers, such as the aerosol creation system shown in FIGS. 26A and 26B.

The multi-rollers aerosol creation systems also include a fluid source that coats the first roller and the second roller with the fluid. A driving element is structured to drive the first roller and the second roller to rotate with respect to each other. In some examples, the first roller and the second roller counter-rotate with respect to their respective diverging surfaces, such as the example aerosol creations systems shown in FIGS. 20A, 20B, 21A, and 21B. In other examples, the first roller and the second roller co-rotate with respect to their respective diverging surfaces, such as the examples shown in FIGS. 22A, 22B, 23A, 23B, 24A, 24B, 25A, and 25B. Any suitable number of rollers and respective diverging surfaces can be included in the multi-roller systems.

FIGS. 20A, 20B, 21A, and 21B show example systems 2000, 2100 having six rollers that counter rotate with respect to each other, in an alternating fashion in which three rollers 2002 rotate clockwise and three alternating rollers 2004 rotate counter-clockwise. In both examples shown in FIGS. 20A, 20B, 21A, and 21B, each of the six rollers 2002, 2004 is driven and can be coated with the fluid in any manner described above regarding any of the single roller and diverging surface examples. For example, the rollers 2002, 2004 can be coated by a slot-coating method in the systems 2000, 2100 shown in FIGS. 20 and 21 or by a pressure method such as pressurizing the downstream sides of the nips.

Figure 20A:
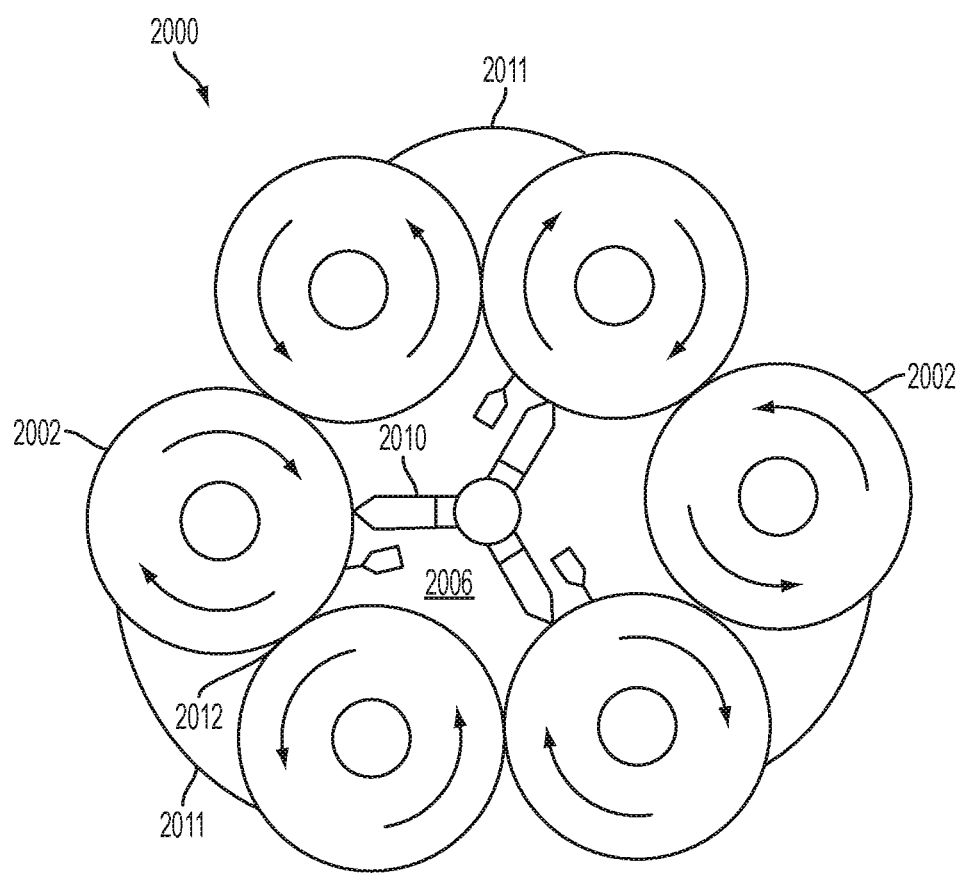
FIGS. 20A and 20B are an example system for creating aerosols with multiple rollers and a three-dimensional perspective view thereof.
Figure 20B:
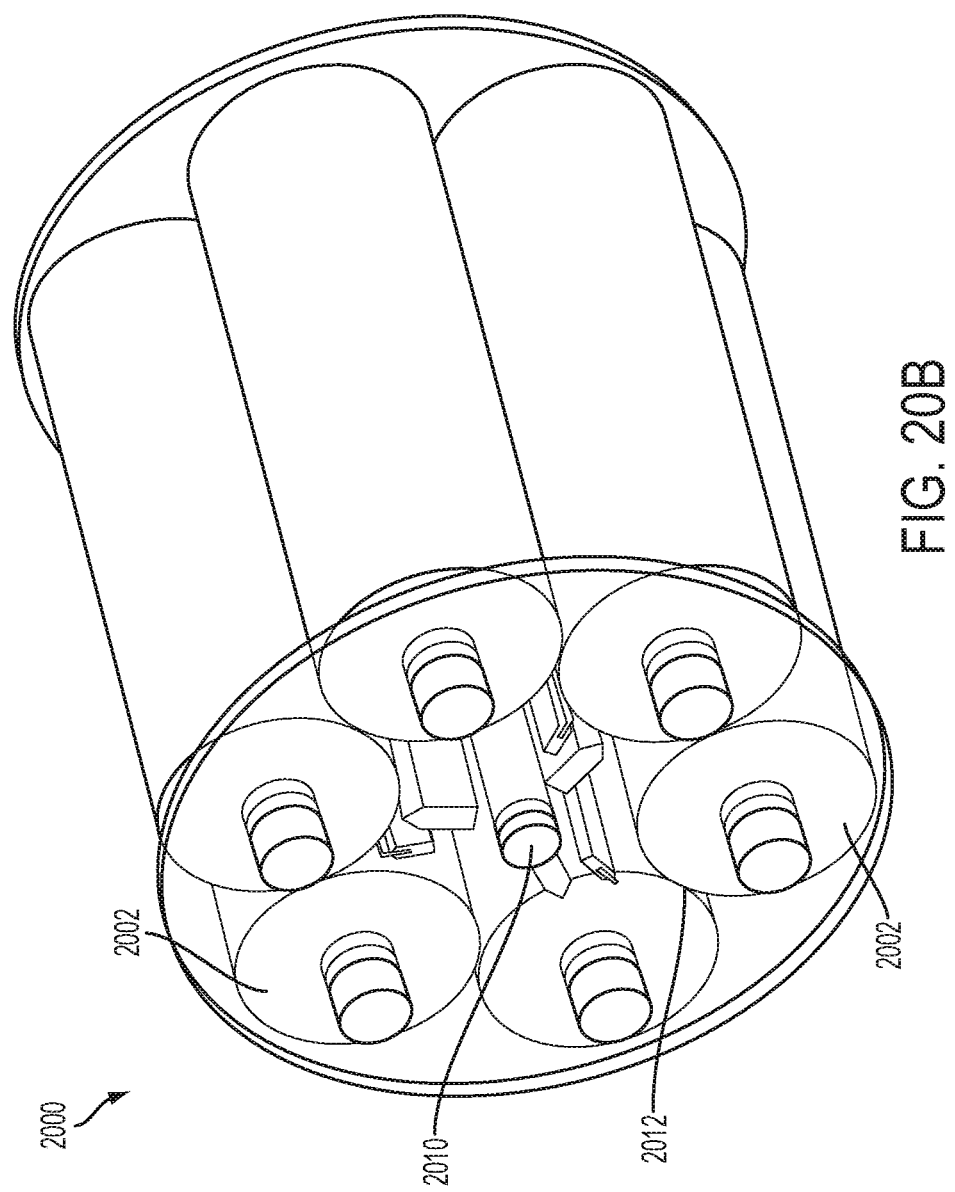

The six rollers in FIGS. 20A, 20B, 21A, and 21B are positioned in a circular configuration with respect to each other although they can be positioned in other configurations as desired. The circular configuration defines an interior space between the rollers and an exterior diameter surrounding the rollers. Each of the rollers rotates in counter-rotation with respect to its neighboring roller. Any suitable structure can support the rollers to be positioned in the circular configuration, such as stationary shafts that hold each roller in its respective position and drive the rollers to rotate. FIG. 20B shows two supporting walls positioned respectively at opposite ends of the rollers that each help hold the rollers in place. Alternatively, a wall or other supporting structure, such as a spacer, can be positioned in either or both of along the exterior diameter of the rollers or within the interior diameter or interior space of the rollers. Other alternative configurations include, but are not limited to, an oval configuration or some other round or curved configuration. The disclosed multi-roller systems can include rollers with any desired materials, texturing, and surface treatments, such as the examples discussed above for the two-roller/piston systems.

In FIGS. 20A and 20B, three 2002 of the six rollers are coated with a fluid from a fluid source 2010. The fluid source 2010 is positioned in the interior space 2006 of the circular configuration of the six rollers. The fluid source 2010 coats every other roller 2002 in the circular configuration of the six rollers, although in alternative examples the fluid source coats every roller or any suitable number of rollers. The fluid coats the three rollers 2004 and is drawn through a nip 2012 defined between alternating sets of counter-rotating rollers. Each nip 2012 has an upstream side and a downstream side and draws fluid through the nip 2012 toward a downstream side. The fluid filament 2011 is stretched between respective surfaces of the coated rollers 2004 and the alternating non-coated rollers 2002 on the downstream sides of the nips 2012. The fluid filaments 2011 are caused to break into a plurality of droplets on the downstream sides of each of the nips 2012.

The plurality of droplets travels in a direction away from the downstream side of the nips 2012. In the example shown in FIGS. 20A and 20B, three arrows 2014 show the direction the plurality of droplets travel. The formed droplets can be harvested and directed in any manner discussed above.

Figure 21A:
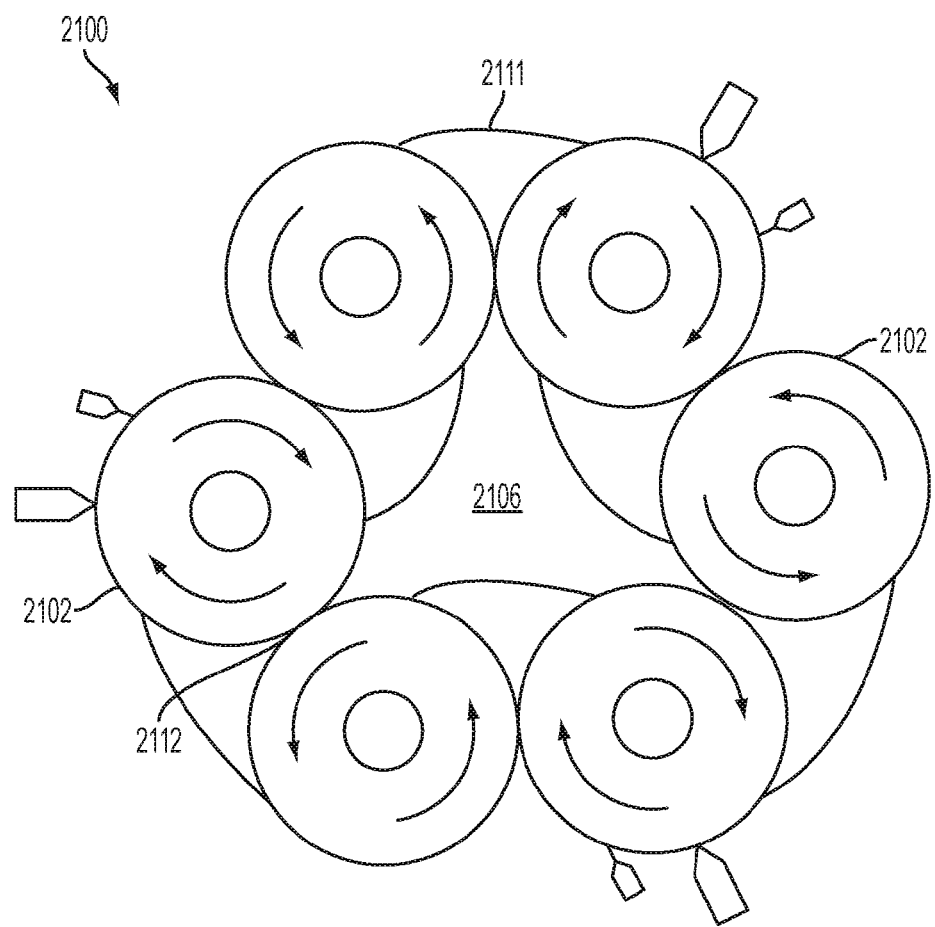
FIGS. 21A and 21B are another example system for creating aerosols with multiple rollers and a three-dimensional perspective view thereof.
Figure 21B:
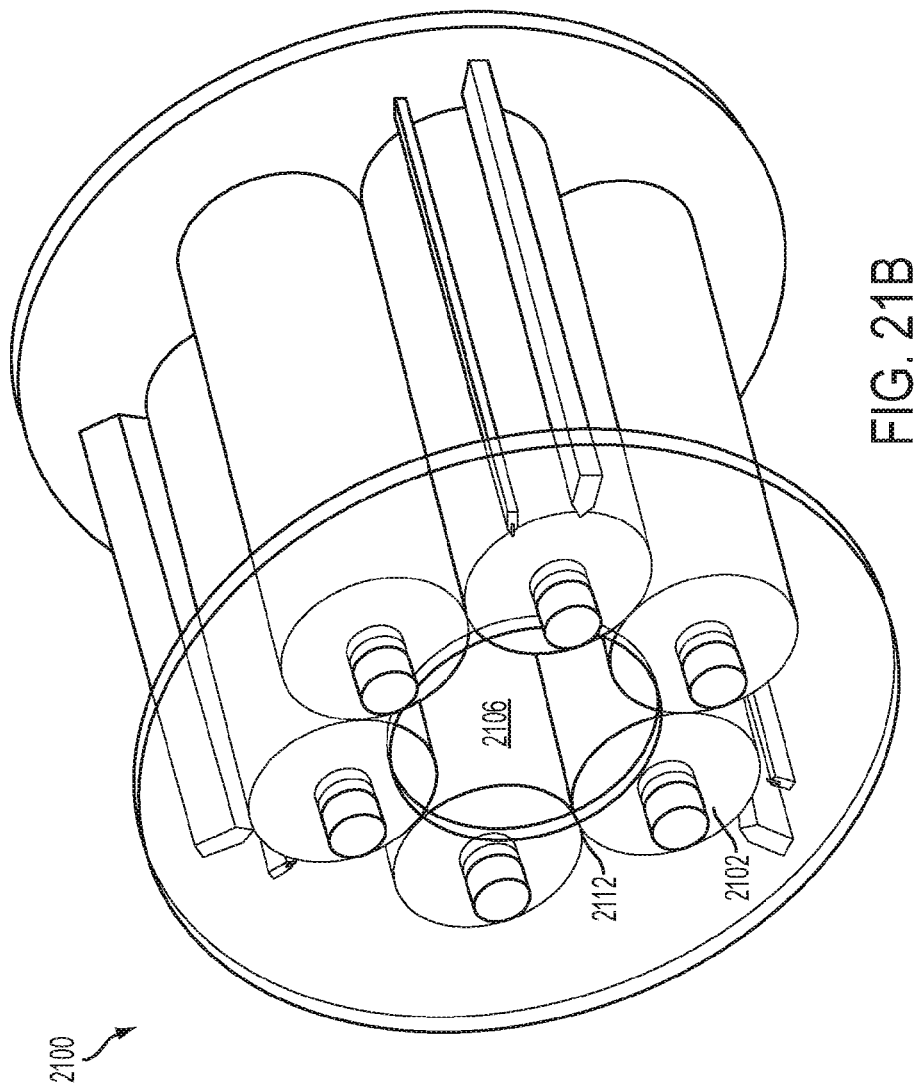

FIGS. 21A and 21B show another example six roller aerosol creation system 2100 in which clockwise rotating rollers 2102 are coated with a fluid from the exterior diameter 2108 of the circular configuration of the rollers 2102, 2104. The three coated rollers 2102 rotate clockwise in FIGS. 21A and 21B, which is the opposite rotation of the rollers 2004 coated in the example system shown in FIGS. 20A and 20B. The upstream sides of the nips 2112 in the system shown in FIGS. 21A and 21B are positioned on the exterior diameter 2108 and the downstream sides of the nips 2112 are positioned within the interior space 2106 between the six rollers 2102, 2104.

The configuration with the three clockwise-rotating rollers 2102 being coated along the exterior diameter cause the fluid to be stretched between surfaces of neighboring rollers on the downstream side of the nips 2112 and within the interior space 2106 of the circular configuration of the rollers 2102. The fluid filaments 2111 are caused to break into a plurality of droplets within the central interior space 2106 of the circular configuration of the rollers, in this example. The droplets break in a direction away from the downstream sides of each nip. As in the example shown in FIGS. 20A and 20B, the formed droplets can be harvested and directed in any manner discussed above in regards to the two roller/piston examples. FIG. 21B shows an example supporting structure that has two walls positioned at both ends of the rollers to hold the rollers in place during rotation.

Figure 22A:
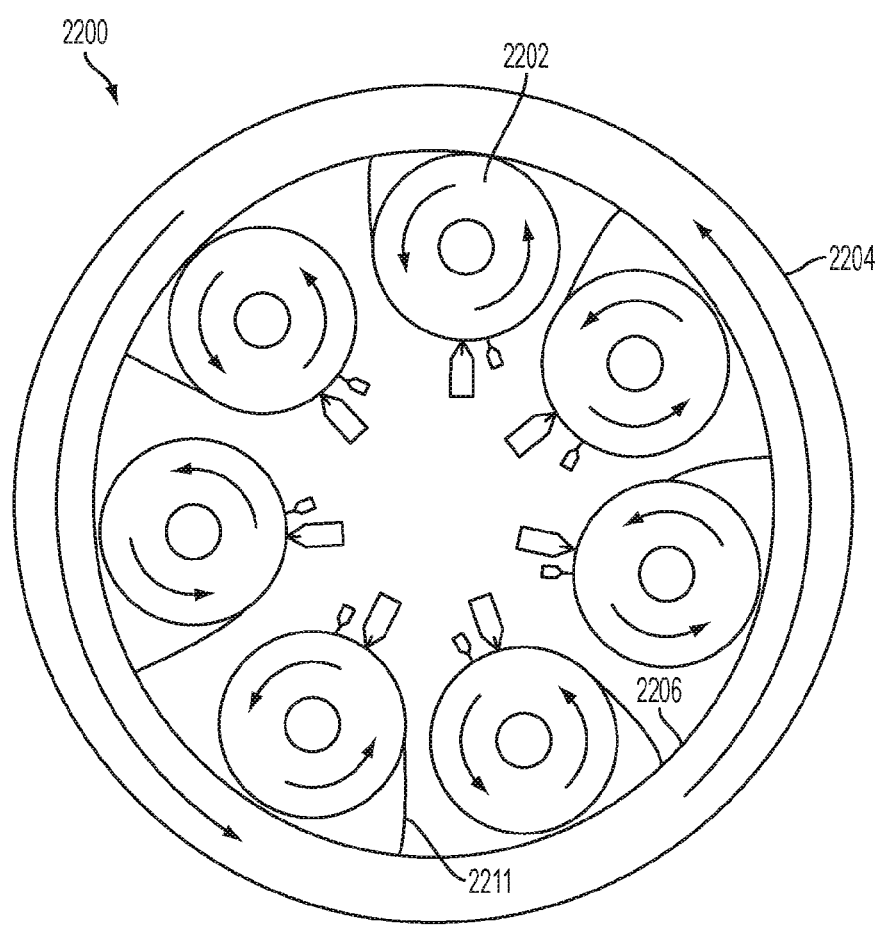
FIGS. 22A and 22B are yet another example system for creating aerosols with multiple rollers and a three-dimensional perspective view thereof.
Figure 22B:
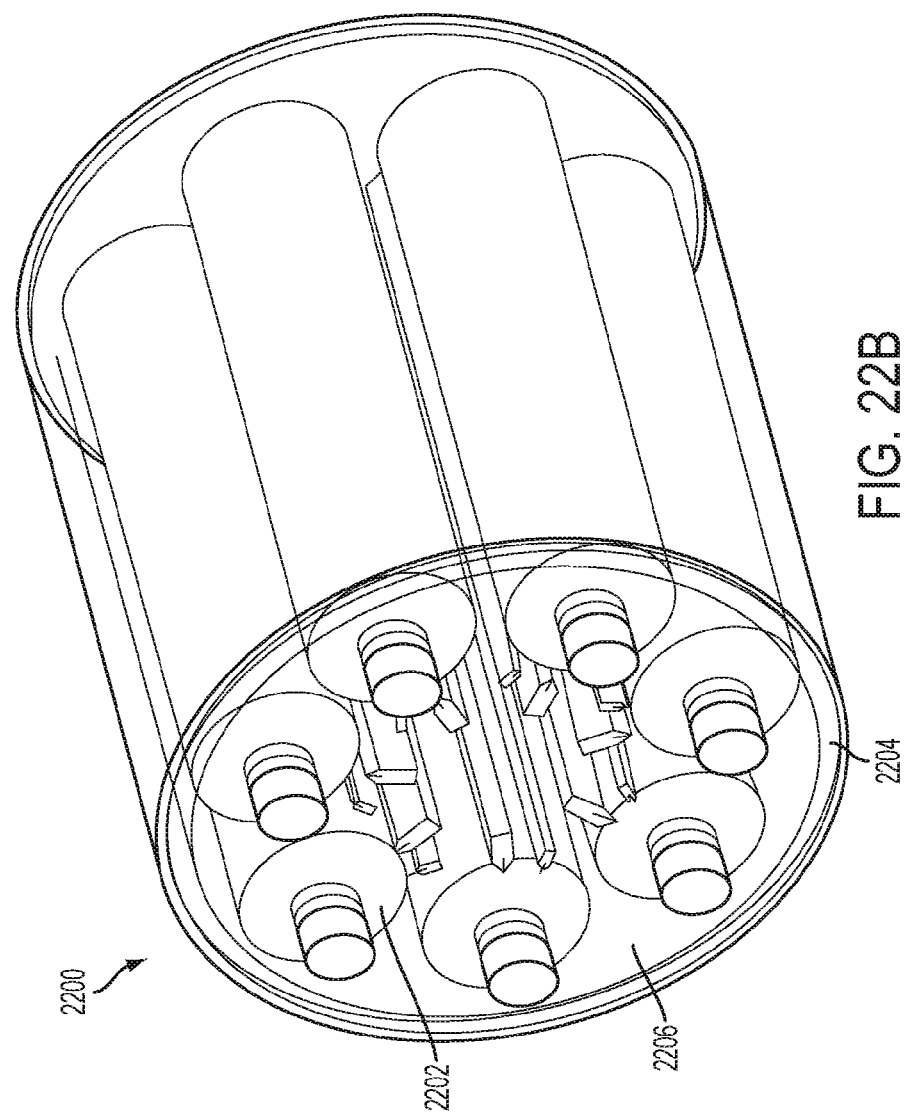

FIGS. 22A and 22B show still another example aerosol creation system 2200 having seven rollers 2202 that are positioned in a circular configuration. Each of these rollers 2202 are spaced apart from each other and co-rotate. The rollers are positioned within a ring 2204, or any other supporting structures in alternative examples, that also co-rotates with the rollers 2202. The diverging surfaces of each set of rollers shown in FIGS. 22A and 22B is a surface of a ring against a surface of each roller. The diverging surface of the aerosol creation system 2200 shown in FIGS. 22A and 22B is the same surface for each roller—the exterior ring 2204 that surrounds the six rollers 2202 and defines an exterior diameter around the circular configuration of the rollers 2202. The seven rollers 2202 rotate by slipping along an inner surface 2206 of the exterior ring 2204 with respect to each other.

The exterior ring 2204 can include the fluid source that coats one or more of the rollers shown in FIGS. 22A and 22B. The fluid source can coat the rollers through slots in the exterior ring, in some examples, or any other suitable coating method. The rollers can also be coated by the slip coating methods discussed above in which the fluid source is positioned within the central interior space of the circular configuration of the rollers opposite the ring. The rollers are spaced apart from each other along the inner surface of the ring. Thus, the rollers 2202 can slip along the inner surface 2206 of the exterior ring 2204 as they rotate. The rollers 2202 physically contact the inner surface of the exterior ring 2204, in some examples it may even be a positive gap, and in other examples the rollers are positioned slightly apart from the inner surface of the ring. The fluid is stretched between the inner surface 2206 of the exterior ring 2204 and the surface of each roller 2202 to create fluid filaments 2211 that are caused to break into a plurality of droplets.

Figure 23A:
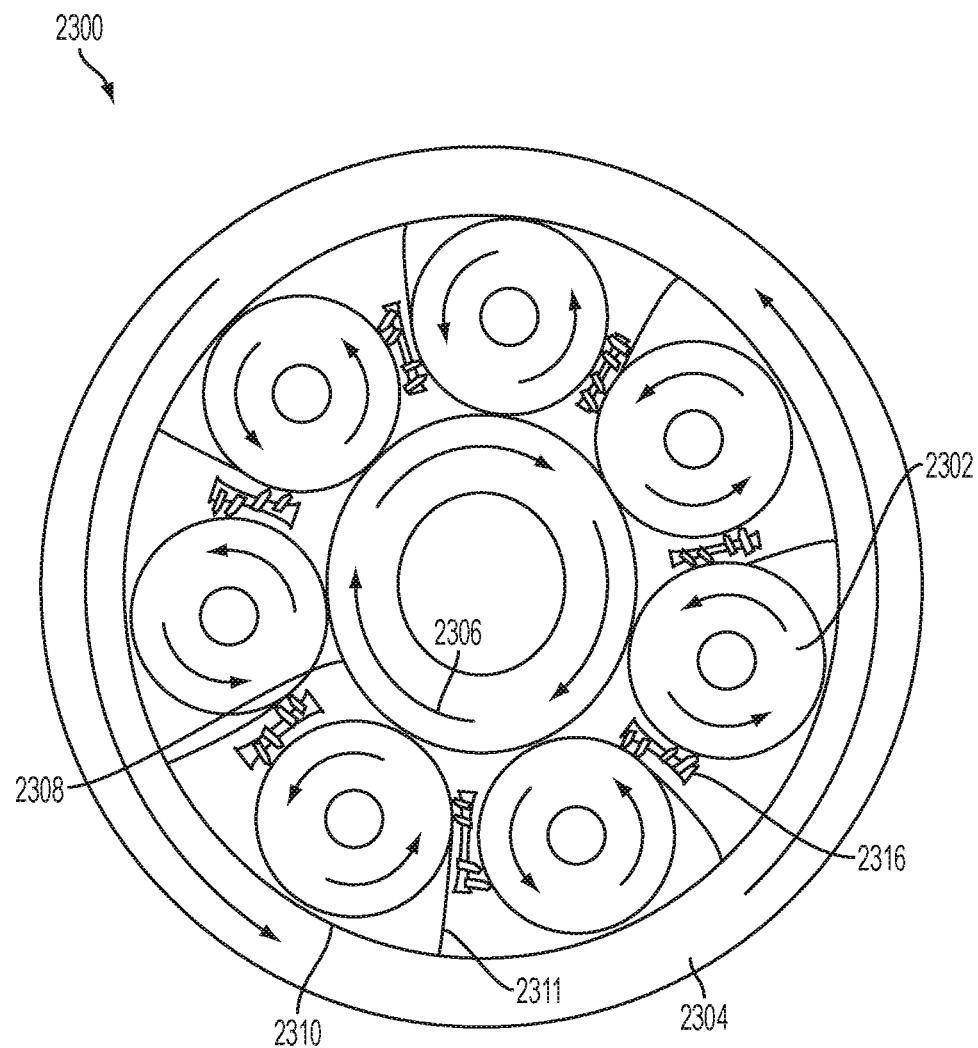
FIGS. 23A and 23B are still another example system for creating aerosol with multiple rollers and a three-dimensional perspective view thereof.
Figure 23B:
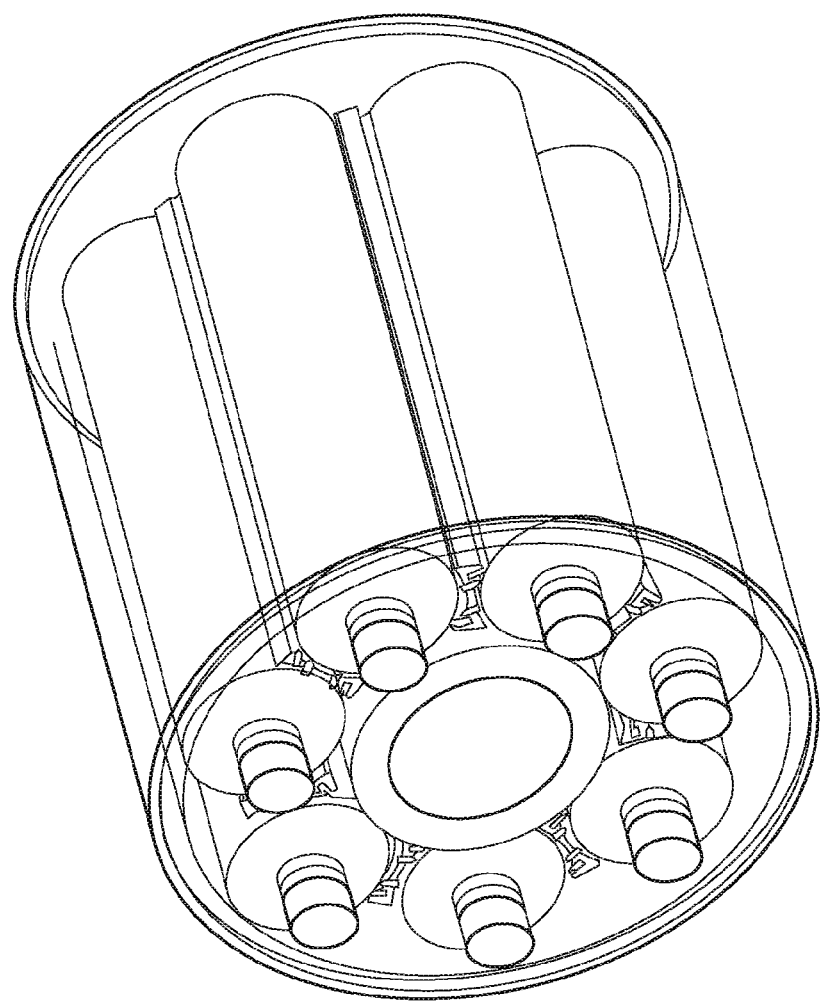

In some examples, such as the aerosol creation system 2300 shown in FIGS. 23A and 23B, an interior ring 2310 or other round structure is positioned concentrically within the exterior ring 2304 and each of the rollers 2302 is positioned between the interior ring 2310 and the exterior ring 2304. The rollers 2302 are stationary with respect to the interior ring 2310 and are in direct contact with the outer surface 2312 of the interior ring 2310. The driving element can be structured to drive the rollers 2302 to rotate by applying power to the interior ring 2310, which causes the rollers 2302 to slip along the inner surface 2314 of the exterior ring and stretch fluid on downstream sides of each rollers and diverging surface combination's nip. The inner surface of the exterior ring is each roller's diverging surface in this example.

Figure 23C:
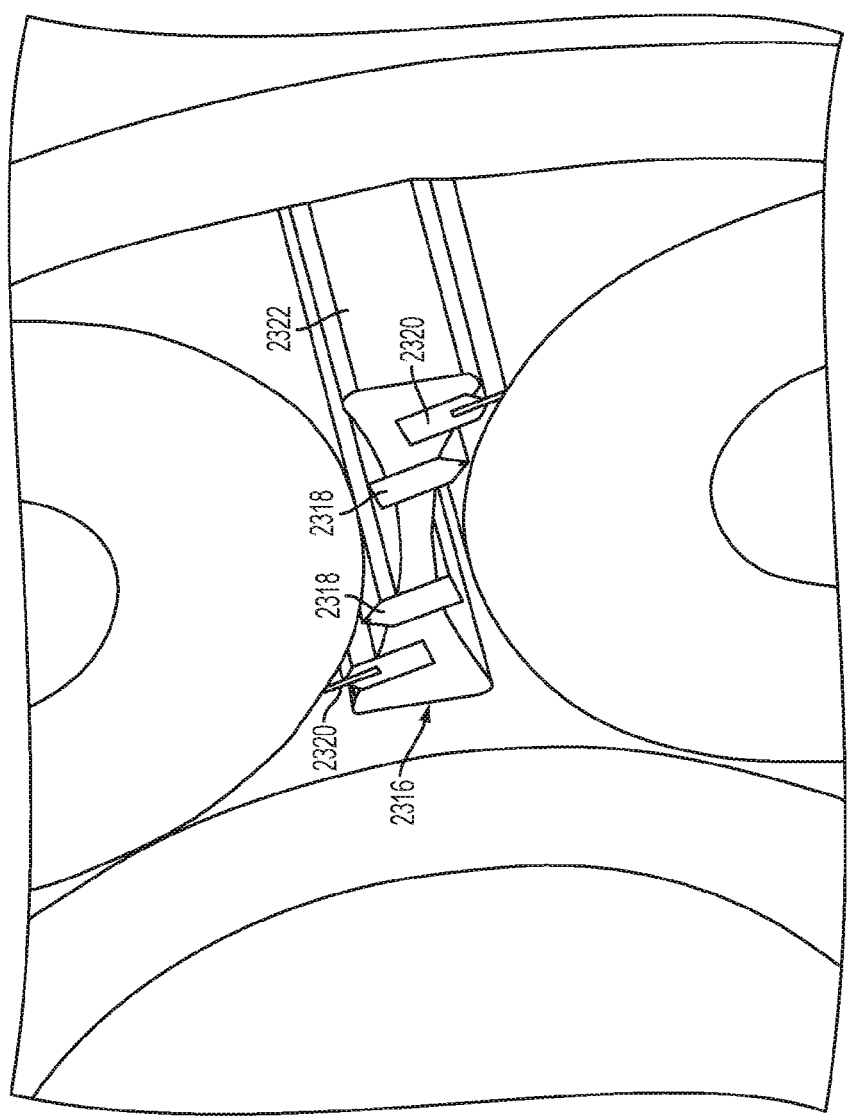
FIG. 23C is a blown up view of one of the spacers shown in FIGS. 23A and 23B.

In the examples shown in FIGS. 23A and 23B, the aerosol creation systems include a combination fluid source and doctoring blade element 2316. The combination fluid source and doctoring blade element 2316 can also serve as a spacer to space apart the rollers 2302. The combination fluid source and doctoring blade element 2316 includes a fluid source that coats the surface of the rollers from its location between the rollers. However, the rollers in FIGS. 23A and 23B and any other exampled discussed herein can be coated from any location upstream of the nip. FIG. 23C shows a close up view of the combination fluid source and doctoring blade element 2316 that includes a fluid source 2318, a doctoring blade 2320, and a spacer 2322.

FIGS. 23A and 23B show an aerosol creation system 2300 in which the exterior ring 2304 can be stationary or could rotate and is in direct physical contact with the six rollers 2302. The interior ring 2306 is concentrically positioned within the exterior ring 2304 and the rollers 2302 are positioned between the interior ring 2306 and the exterior ring 2304. The rollers 2302 can be spaced apart from the outer surface 2308 of the interior ring 2306 and each other to allow the rollers 2302 to slip along the surface 2308. Each roller's nip 2310 is defined between the surface of the roller 2302 and the outer surface 2308 of the interior ring 2306. The outer surface 2308 of the interior ring 2306 is each roller's diverging surface in this example. Fluid is drawn through the nip and is stretched on the downstream side of the nip to form a fluid filament 2311 that ultimately breaks into a plurality of droplets.

The rollers 2302 are positioned in direct contact with and stationary with respect to the inner surface 2310 of the exterior ring 2304 in FIG. 23 and spaced apart from the outer surface 2308 of the interior ring 2306 and each other to facilitate slip between the rollers 2302 and the outer surface 2308 of the interior ring 2306. The driving element of the aerosol creation system 2300 shown in FIGS. 23A and 23B can be structured to apply power to the exterior ring 2304, which causes the rollers 2304 to slip along the outer surface 2308 of the interior ring 2306 and stretch the fluid on the downstream sides of each roller's nip 2308. The rollers and/or the exterior ring co-rotate. The interior ring can either be stationary or could counter-rotate with respect to the rollers and the exterior ring.

Figure 24A:
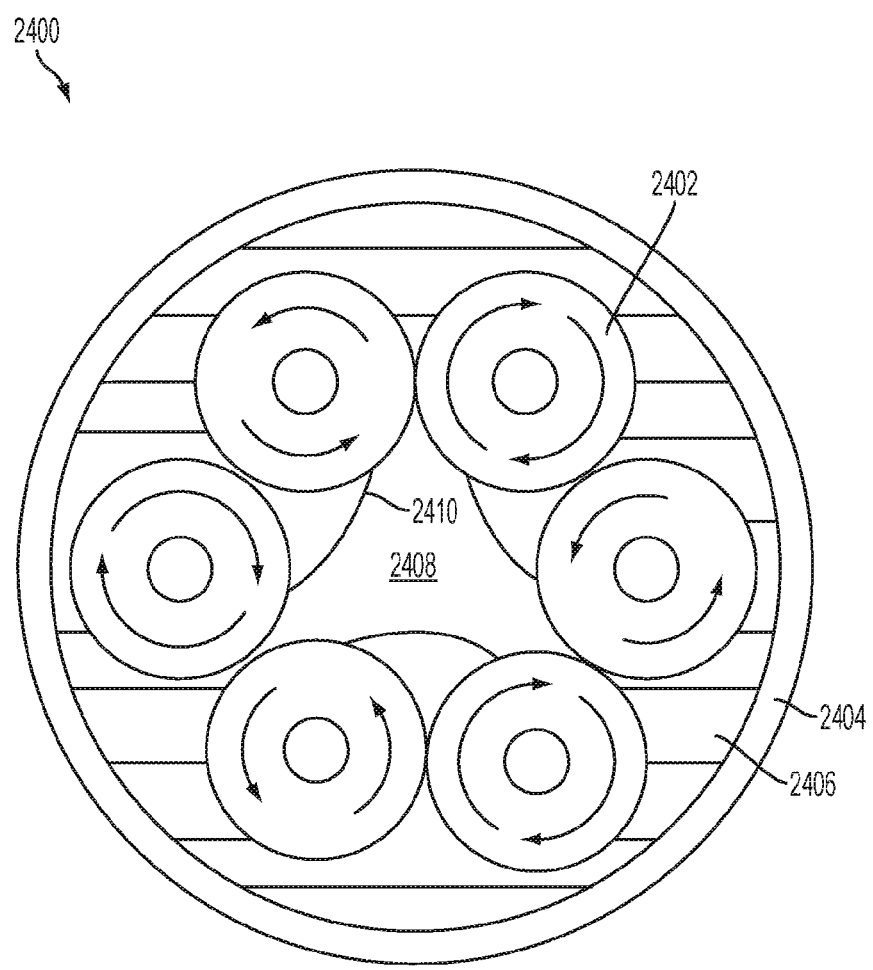
FIGS. 24A and 24B are an example system for creating aerosols with multiple rollers and a three-dimensional perspective view thereof.
Figure 24B:
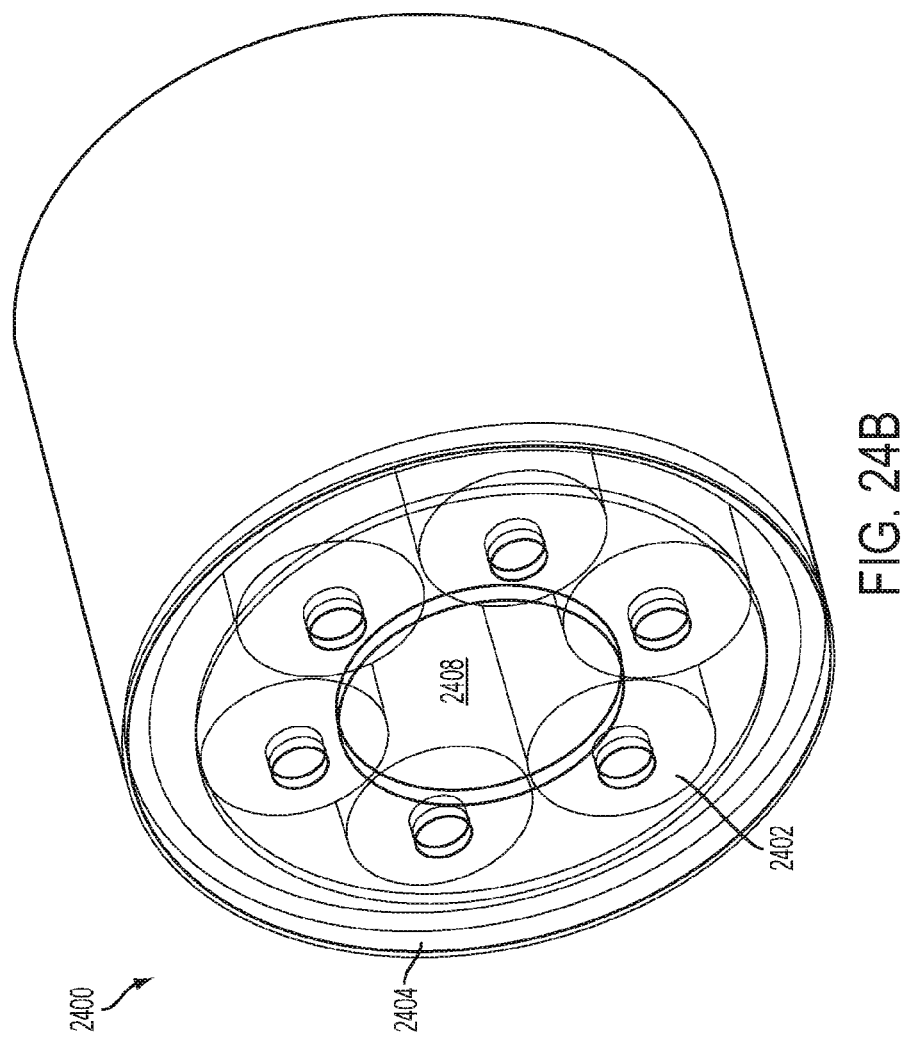

FIGS. 24A and 24B show yet another example multi-roller aerosol creation system 2400 with five rollers 2402 in a circular configuration. A ring 2404 extends around all five of the rollers 2402 in this example. The ring 2404 can include the fluid source 2406. In this example, the rollers 2202 are positioned to physically touch each other in a circular configuration and are spaced apart from the ring 2404. The fluid source is the fluid 2406 housed in the space between the rollers 2402 and the ring 2404. In this example, the downstream sides of the nips are positioned within the central interior space 2408 defined within the circular configuration of the rollers 2402. The fluid filaments 2410 break in a direction toward the central interior space 2408.

Figure 25A:
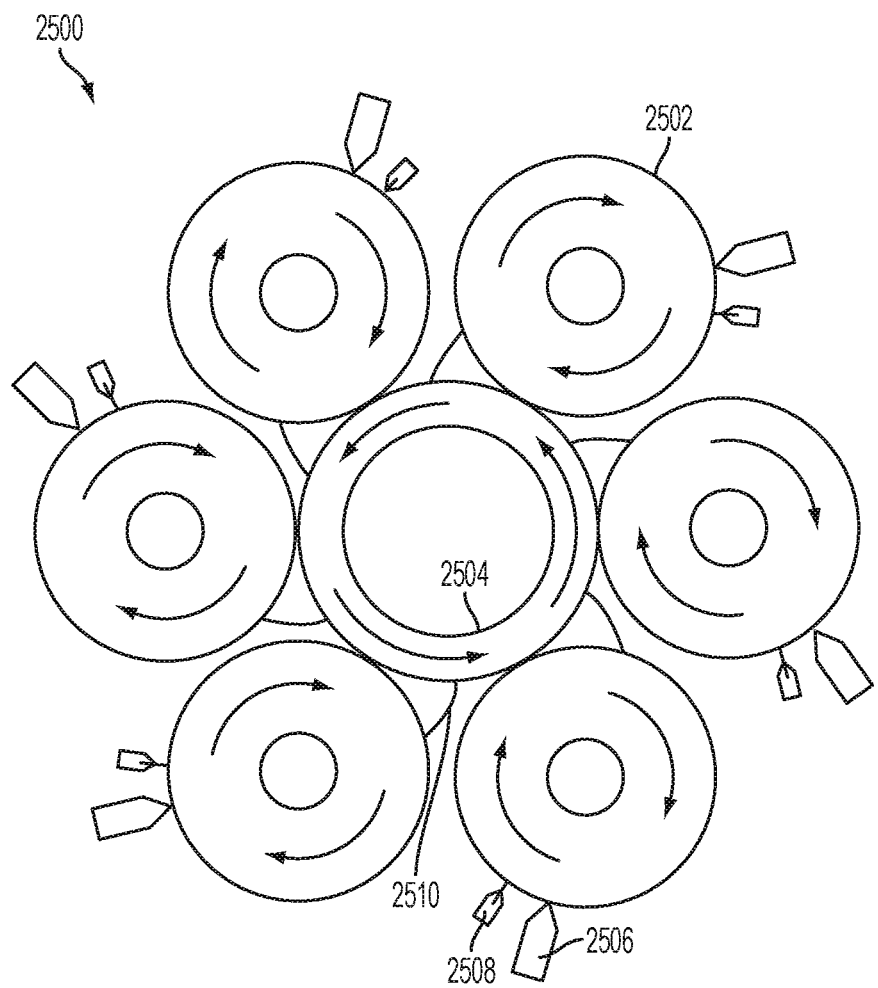

FIGS. 25A and 25B show still another example multi-roller aerosol creation system 2500 with six rollers 2502 positioned in a circular configuration around a central ring 2504. The rollers 2502 co-rotate and are spaced apart from each other. The nips are defined between the surface of each roller and the exterior surface of the central ring 2504. The fluid filaments 2510 stretch and eventually break across the downstream side of each nip. In the example shown in FIGS. 25A and 25B, the fluid source 2506 and the doctoring blade 2508 are each positioned on the upstream side of each nip 2511.

Figure 26A:
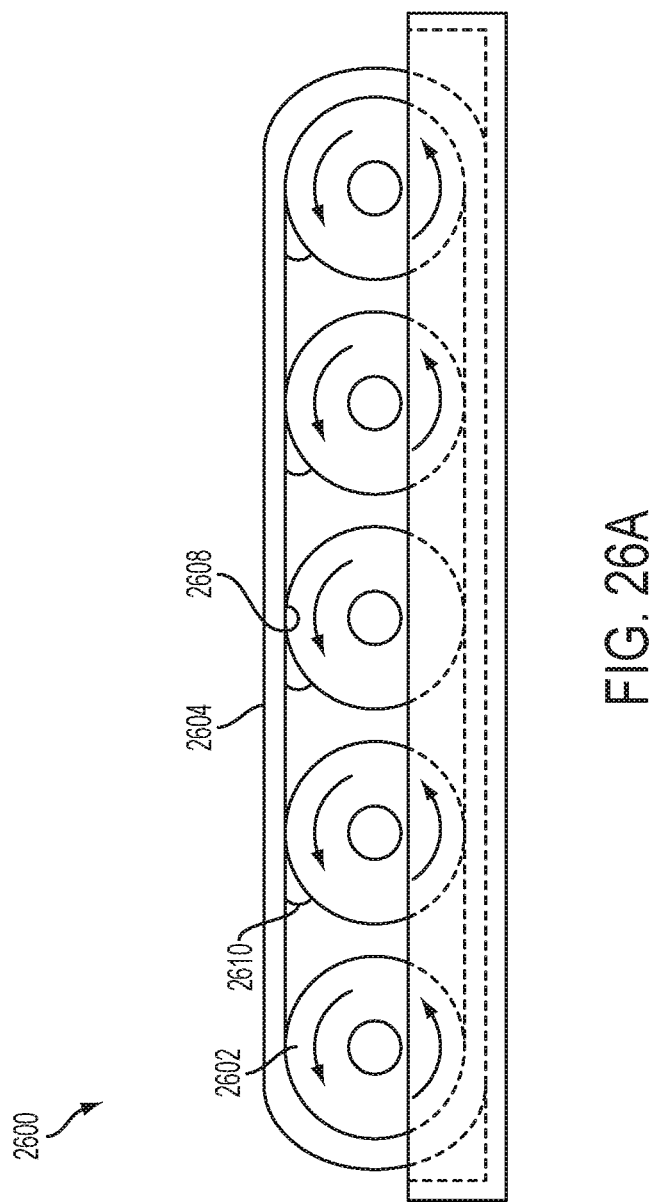
FIGS. 26A and 26B are yet another example system for creating aerosols with multiple rollers and a three-dimensional perspective view thereof.
Figure 26B:
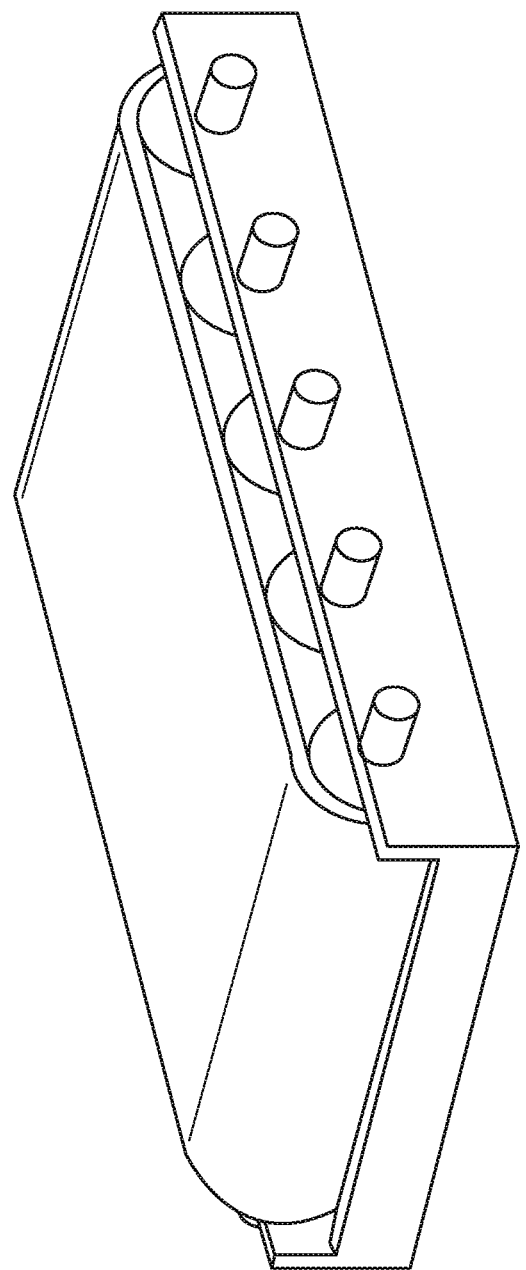

FIGS. 26A and 26B show yet another example multi-roller aerosol creation system 2600 having five rollers 2602 in a linear configuration. A belt 2604 surrounds the rollers 2602. The rollers 2602 are spaced apart from each other and the combination belt 2604 and rollers 2602 are partially submerged in a tray 2606 that contains fluid. Either the belt or the rollers rotate. In this example, however, the rollers co-rotate with respect to each other and the belt in stationary. The nip 2608 is formed between the surface of the roller and the interior surface of the upper portion of the belt 2604. The fluid is drawn through the nip 2608 and is stretched into a fluid filament 2610 on the downstream side of the nip 2608 until is breaks into a plurality of droplets. Although not shown in this example, a doctoring blade or other thickness controlling mechanism can be included to control the thickness of the fluid entering the nip on the upstream side.

The diverging surface for each roller 2602 is a portion of the inner surface of the belt 2604. As the belt 2604 rotates, it causes the rollers 2602 to also rotate. Because the rollers 2602 are partially submerged in the fluid, the rotation of the rollers 2602 causes the fluid that coats each roller 2602 to be drawn through each roller's respective nip 2608 and stretched between the surface of the roller 2602 and the portion of the inner surface of the belt 2604 that corresponds to each roller 2602 and forms each roller's nip 2608. As with the examples discussed above, the fluid is stretched into a fluid filament 2610 and ultimately breaks into a plurality of droplets of the fluid. The belt can include any suitable materials including right and semi-rigid materials. The belt configuration of the aerosol creation system 2600 shown in FIGS. 26A and 26B are shown in a horizontal arrangement, but can be other arrangements, as desired, such as curved, vertical, or the like.

All of the example multi-roller aerosol creation systems shown in FIGS. 20A-26B can further include any harvesting, directing, or otherwise manipulated in any manner discussed in this disclosure. Still further, all of the example multi-roller aerosol creation systems shown in FIGS. 20A-26B can include any suitable number of rollers and can include alternative configurations. For example, the rollers in the examples shown in FIGS. 20A-23B can be positioned in an oval or other round configuration and can include any even number of rollers. In another example, the aerosol creation system shown in FIG. 24A can include any number of rollers, even or odd, and can be a horizontal or curved configuration.

Increasing the number of rollers in the multiple roller aerosol creation systems shown in FIGS. 20A-26B increase the number for stretched fluid filaments that break into the plurality of droplets of fluid and thus the volume of the formed mist. Varying the configuration of the rollers and the type of diverging surface that when combined with the roller surface defines each nip varies the direction of travel of the plurality of droplets formed when the fluid filaments break. Surface treatments of each surface that contacts the rollers, the diverging surfaces, and/or the fluid can also alter or otherwise control the manner in which the droplets are formed.

Any portion of the aerosol creation systems described above can be pressurized to help draw fluid through any respective nip. For example, providing a higher pressure on the upstream sides of the nips relative to the downstream sides of the nips helps draw fluid through the nips to be stretched into fluid filaments and broken into droplets. As discussed above, any system of controlling the thickness of the fluid as the fluid is drawn through each nip can be included in any of the described aerosol creation systems. For example, a doctoring blade or doctoring roller can be positioned near the roller as it rotates on the upstream side of its nip to control and make uniform the thickness of the fluid coating the roller as it is drawn into the nip. Controlling the thickness of the fluid being drawn into the nip controls the concentration and volume of droplets formed after the fluid filament is broken on the downstream side of the nip.

It will be appreciated that variations of the above-disclosed systems and methods for creating aerosols and other features and functions, or alternatives thereof, may be desirably combined into many other different systems, methods, or applications. Also various presently unforeseen or unanticipated alternatives, modifications, variations, or improvements therein may be subsequently made by those skilled in the art.

The invention claimed is:

1. An aerosol creation system, comprising:
   a first roller;
   a second roller spaced apart from the first roller;
   a ring within which the first roller and the second roller are positioned;
   a first nip defined between a surface of the first roller and an interior surface of the ring, the first nip having an upstream side and a downstream side;
   a second nip defined between a surface of the second roller and the interior surface of the ring, the second nip having an upstream side and a downstream side;
   a fluid source that coats the first roller and the second roller with a fluid;
   a driving element structured to drive the first roller and the second roller to co-rotate and to cause the fluid on the first roller to be drawn through the upstream side of the first nip to the downstream side of the first nip to be stretched between diverging surfaces of the first roller and the interior surface of the ring and to cause the fluid on the second roller to be drawn through the upstream side of the second nip to the downstream side of the second nip to be stretched between diverging surfaces of the second roller and the interior surface of the ring, and
   wherein the fluid stretched between the diverging surfaces of the first roller and the interior surface of the ring forms a first fluid filament that breaks into a plurality of first droplets and the fluid stretched between the diverging surfaces of the second roller and the interior surface of the ring forms a second fluid filament that breaks into a plurality of second droplets.

2. The aerosol creation system of claim 1, wherein the first roller and the second roller are positioned along an interior surface of the ring in a circular configuration.

3. The aerosol creation system of claim 2, wherein the circular configuration of the first roller and the second roller define a central interior space and the fluid source coats the first roller and the second roller with the fluid from a position within the central interior space.

4. The aerosol creation system of claim 2, wherein the fluid source coats the first roller and the second roller with the fluid by coating at least a portion of the interior surface of the ring on an upstream side of the first nip and on an upstream side of the second nip.

5. The aerosol creation system of claim 2, wherein the first roller is in physical contact with the interior surface of the ring at the first nip and the second roller is in physical contact with the interior surface of the ring at the second nip.

6. The aerosol creation system of claim 1, wherein the fluid source coats the first roller and the second roller with the fluid from a position between the first roller and the second roller.

7. The aerosol creation system of claim 1, wherein the driving element is further structured to drive the ring to rotate in the same direction as the first roller and the second roller.

8. The aerosol creation system of claim 1, further comprising a first doctoring blade that controls the thickness of the fluid on the first roller and a second doctoring blade that controls the thickness of the fluid on the second roller.

9. The aerosol creation system of claim 1, wherein a fluid pressure on the upstream sides of the first nip and the second nip is greater than a fluid pressure on the downstream sides of the first nip and the second nip.

10. The aerosol creation system of claim 1, further comprising a third roller spaced apart from the first roller and the second roller and positioned within the ring and a third nip defined between a surface of the third roller and an interior surface of the ring, the third nip having an upstream side and a downstream side, and wherein the driving element is structured to drive the third roller to co-rotate with the first roller and the second roller and to cause fluid to be drawn through the upstream side of the third nip to the downstream side of the third nip to be stretched between diverging surfaces of the third nip and the interior surface of the ring and wherein the fluid is stretched between the diverging surfaces of the third roller and the interior surface of the ring to form a third fluid filament that breaks into a plurality of third droplets.

11. The aerosol creation system of claim 1, wherein the plurality of first droplets break in a direction away from the downstream side of the first nip and the plurality of second droplets break in a direction away from the downstream side of the second nip.

12. The aerosol creation system of claim 11, further comprising a harvesting element that collects the plurality of first droplets and the plurality of second droplets.

* * * * *